United States Patent
Shibata

(10) Patent No.: US 11,006,019 B2
(45) Date of Patent: May 11, 2021

(54) IMAGE PROCESSING METHOD, IMAGE PROCESSING DEVICE, AND IMAGE RECORDING APPARATUS FOR SUPPRESSION GENERATION OF BEATS

(71) Applicant: FUJIFILM Corporation, Tokyo (JP)

(72) Inventor: Hiroyuki Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/556,202

(22) Filed: Aug. 29, 2019

(65) Prior Publication Data

US 2019/0381804 A1 Dec. 19, 2019

(30) Foreign Application Priority Data

Mar. 30, 2017 (JP) .............................. JP2017-068556

(51) Int. Cl.
*H04N 1/405* (2006.01)
*G06K 15/02* (2006.01)
(Continued)

(52) U.S. Cl.
CPC ............ *H04N 1/405* (2013.01); *B41J 2/2054* (2013.01); *B41J 2/2139* (2013.01); *B41J 2/2142* (2013.01);
(Continued)

(58) Field of Classification Search
CPC ............. H04N 1/4015; H04N 1/40081; H04N 1/40087; H04N 1/405–4058; H04N 1/52; G06K 15/1881
See application file for complete search history.

(56) References Cited

U.S. PATENT DOCUMENTS 8,469,474 B2 6/2013 Nakazawa et al.
9,030,712 B2 5/2015 Saito et al.
(Continued)

FOREIGN PATENT DOCUMENTS

JP H02192955 7/1990
JP 2004202795 7/2004
(Continued)

OTHER PUBLICATIONS

International Search Report (Form PCT/ISA/210) of PCT/JP2018/012111, dated May 29, 2018, with English translation thereof, pp. 1-5.
(Continued)

Primary Examiner — Scott A Rogers
(74) Attorney, Agent, or Firm — JCIPRNET

(57) ABSTRACT

Provided are an image processing method, an image processing device, and an image recording apparatus capable of suppressing generation of beats, even in a case where streaky unevenness correction other than non-discharge correction of a recording element is performed, in any nozzle layout shapes. An image processing method comprises an abnormality detection step of detecting an abnormality for each recording element in a recording head in which a plurality of the recording elements are arranged; an invisibilization step of modulating densities of pixels to be recorded on a recording medium by the correction recording element including an abnormal recording element of which the abnormality has been detected to invisibilize a defect of an image, in order to correct the defect of the image resulting from the abnormal recording element depending on a detection result in the abnormality detection step; and a quantization step of quantizing an image to be recorded on the recording medium, and performing the quantization such that a peak frequency component of the quantization is
(Continued)

located in a frequency band excluding a frequency band around a spatial frequency peak of a correction region that is a pixel group to be recorded on the recording medium by the correction recording element of which a density has been modulated by the invisibilization step.

13 Claims, 34 Drawing Sheets

(51) Int. Cl.
*H04N 1/401* (2006.01)
*B41J 2/21* (2006.01)
*B41J 2/205* (2006.01)

(52) U.S. Cl.
CPC ..... *G06K 15/1876* (2013.01); *G06K 15/1881* (2013.01); *H04N 1/4015* (2013.01); *H04N 1/4052* (2013.01)

(56) References Cited

U.S. PATENT DOCUMENTS

| | | | |
|---|---|---|---|
| 2006/0214971 A1* | 9/2006 | Yamazaki | H04N 1/4051 347/15 |
| 2013/0293611 A1 | 11/2013 | Ueshima | |
| 2014/0139855 A1* | 5/2014 | Iguchi | H04N 1/4051 358/1.9 |
| 2014/0313258 A1 | 10/2014 | Ozawa | |
| 2015/0210100 A1* | 7/2015 | Hayashi | B41J 2/2139 347/19 |
| 2015/0286908 A1 | 10/2015 | Shibata | |
| 2015/0290930 A1 | 10/2015 | Shibata | |
| 2015/0360491 A1 | 12/2015 | Billow et al. | |

FOREIGN PATENT DOCUMENTS

| | | |
|---|---|---|
| JP | 2006051617 | 2/2006 |
| JP | 2006297919 | 11/2006 |
| JP | 2011005702 | 1/2011 |
| JP | 2013233682 | 11/2013 |
| JP | 2014100797 | 6/2014 |
| JP | 2014144549 | 8/2014 |
| JP | 2014144610 | 8/2014 |
| JP | 2014210876 | 11/2014 |
| JP | 2017013513 | 1/2017 |

OTHER PUBLICATIONS

"Written Opinion of the International Searching Authority (Form PCT/ISA/237) of PCT/ JP2018/012111", dated May 29 2018, with English translation thereof, pp. 1-12.
"Office Action of Japan Counterpart Application", dated Jul. 8, 2020, with English translation thereof, pp. 1-18.

* cited by examiner

FREQUENCY IN TRANSPORT DIRECTION

FREQUENCY IN PERPENDICULAR TRANSPORT DIRECTION

FREQUENCY IN TRANSPORT DIRECTION

FREQUENCY IN PERPENDICULAR TRANSPORT DIRECTION

PRINT HEAD

PRINT MEDIUM

TRANSPORT DIRECTION

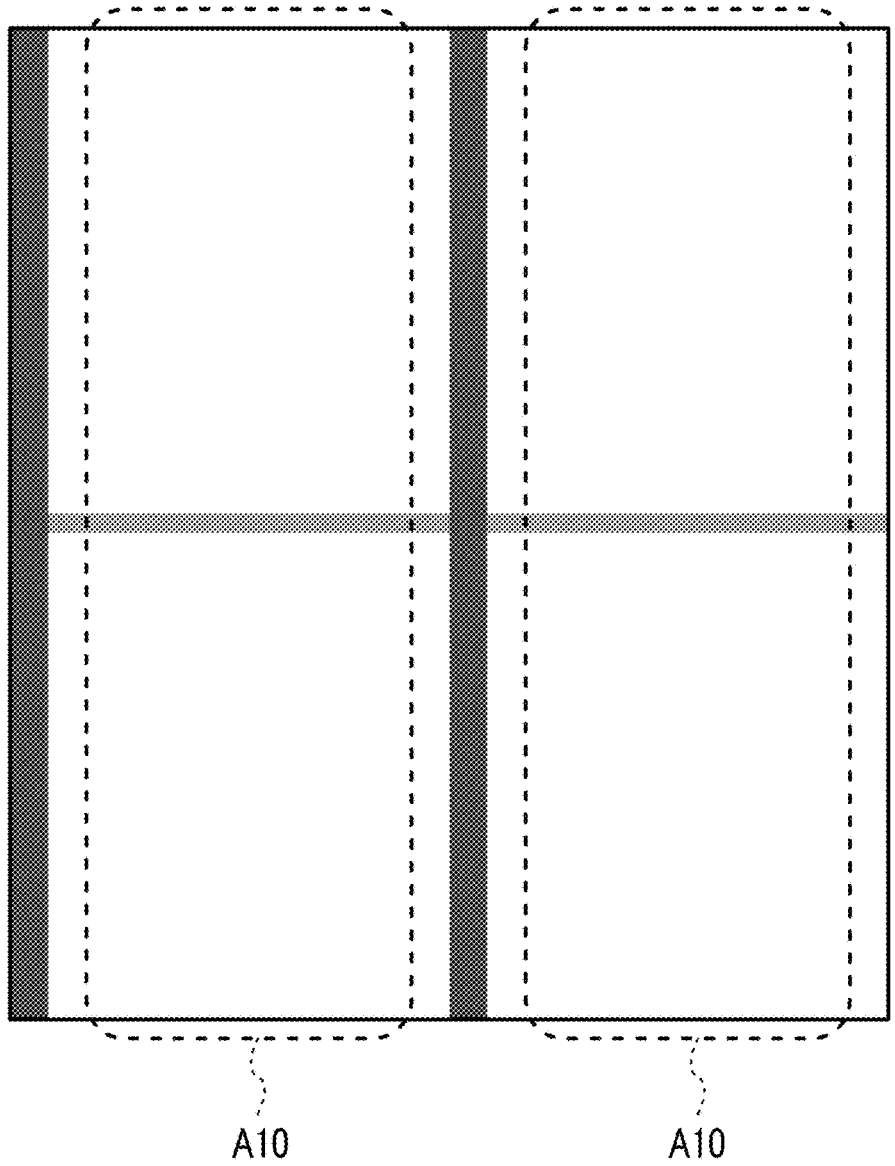

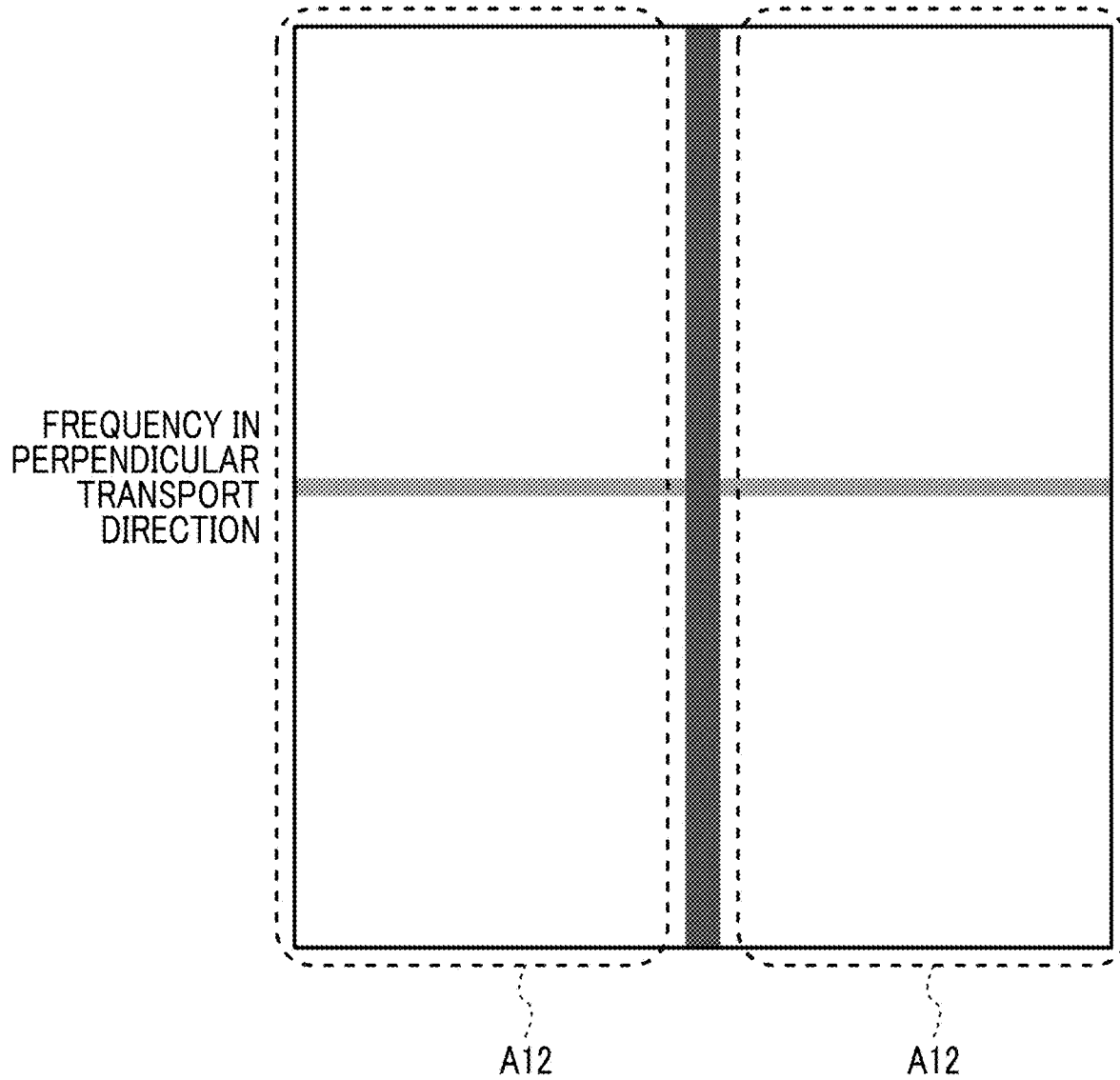

PRINT HEAD

PRINT MEDIUM

TRANSPORT DIRECTION

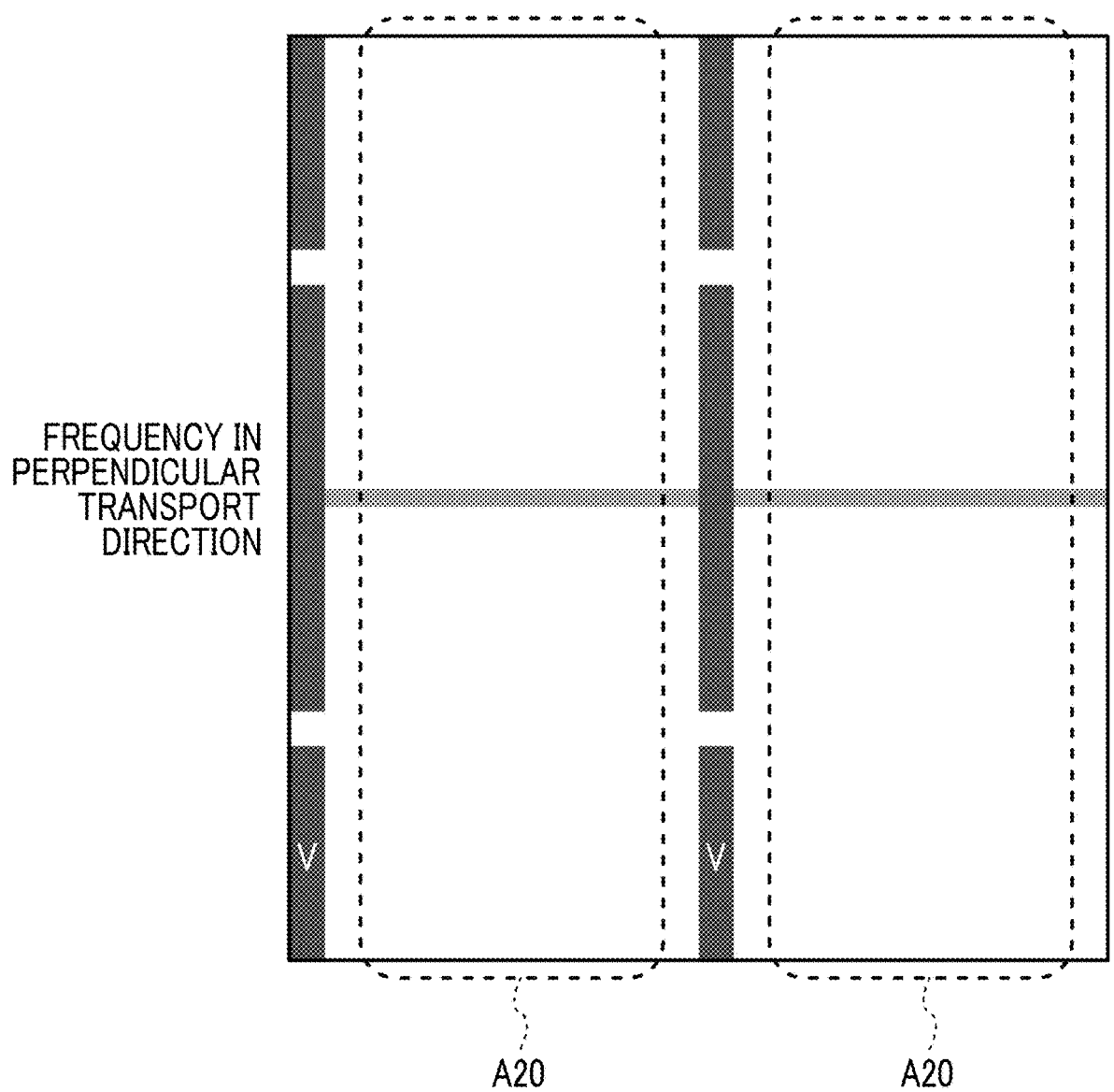

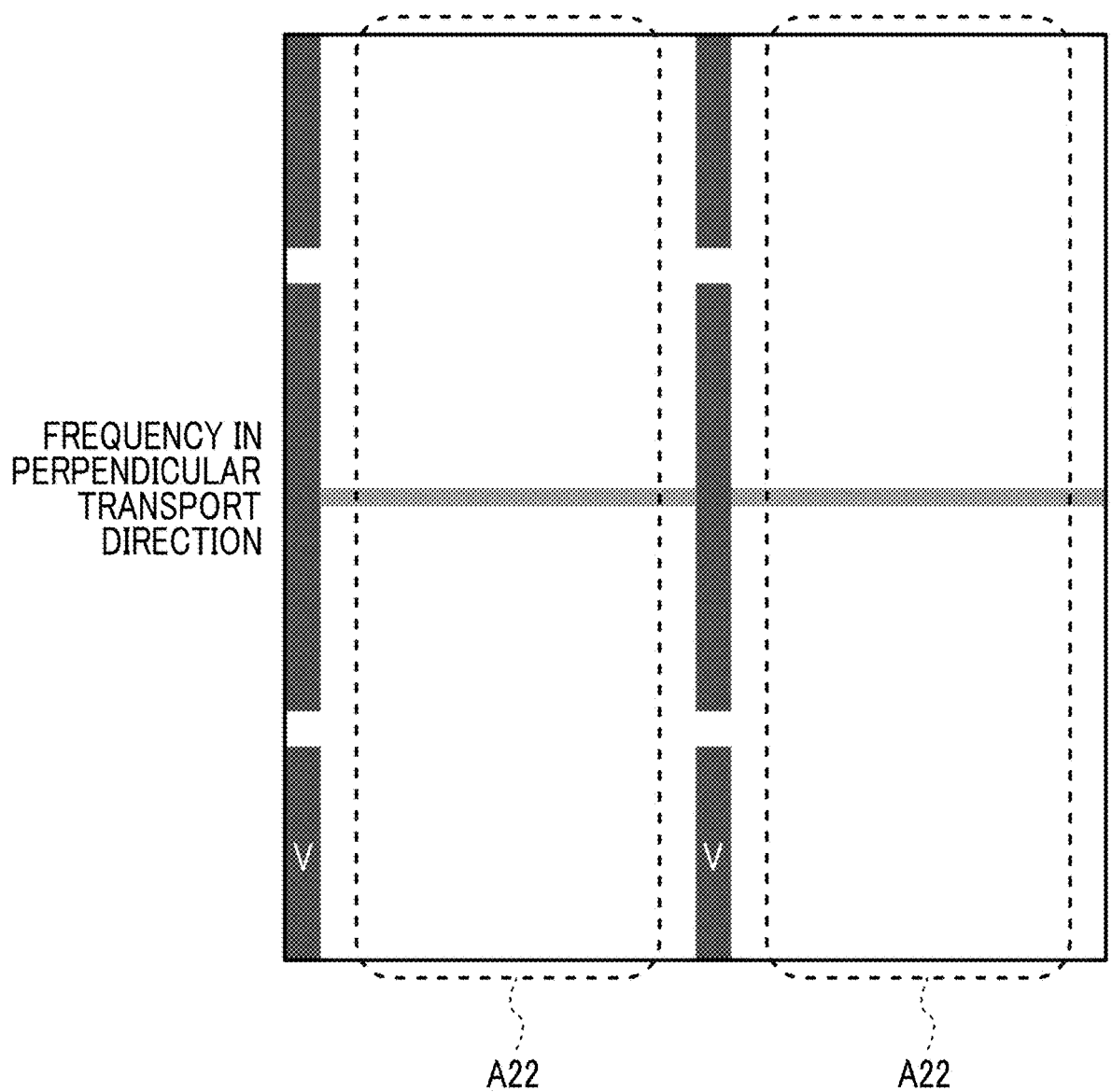

PRINT HEAD

PRINT MEDIUM

TRANSPORT DIRECTION (HIGHEST-DENSITY CORRECTION REGION)

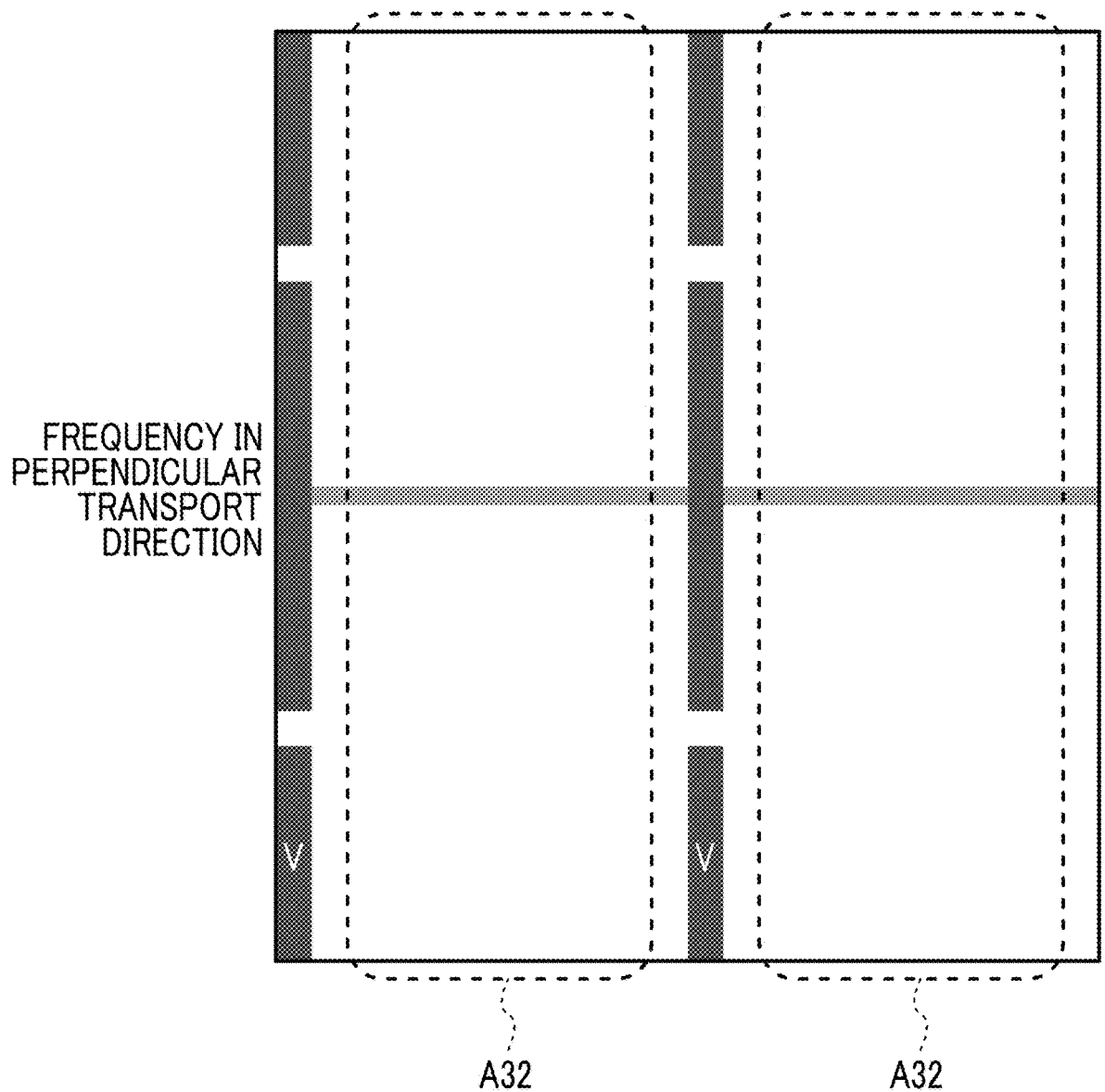

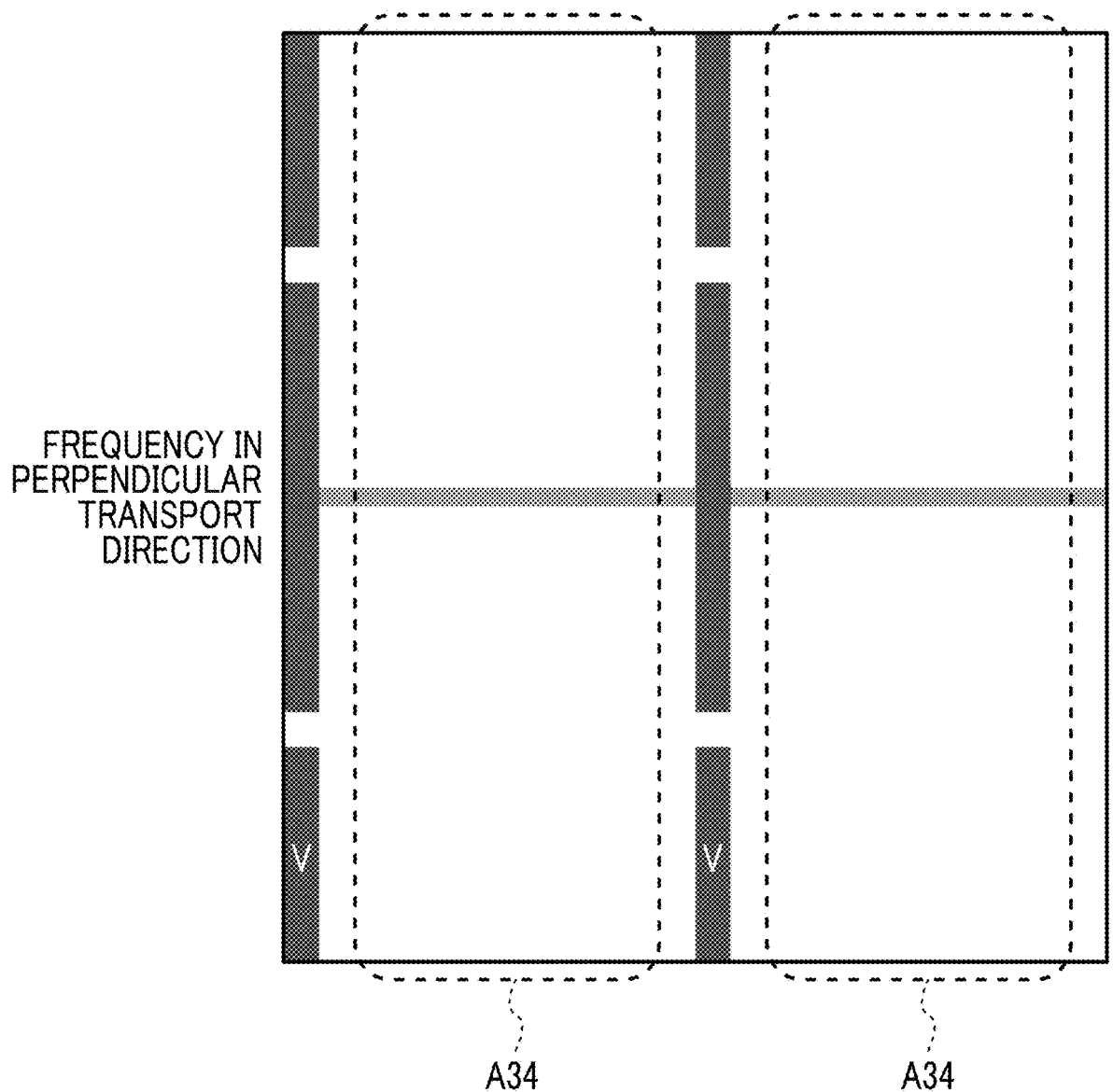

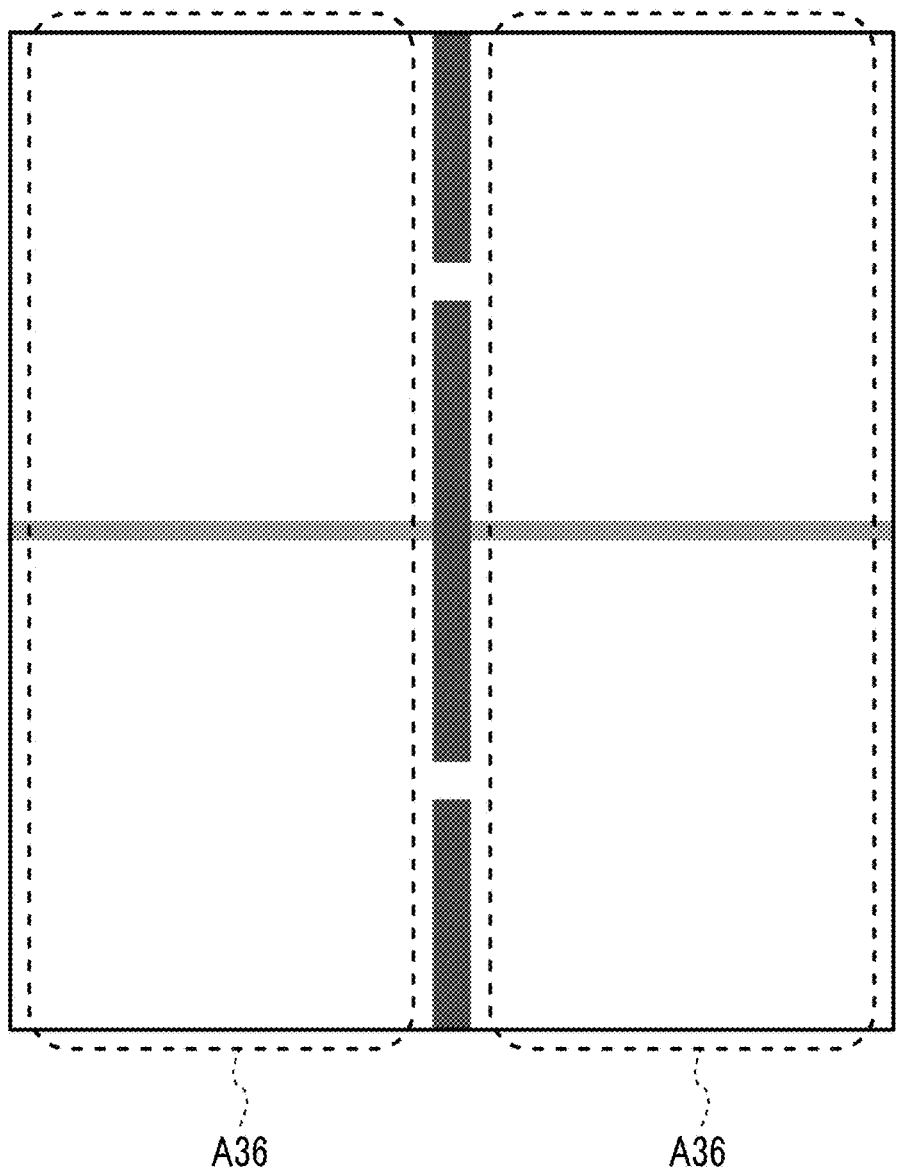

PRINT HEAD

PRINT MEDIUM

TRANSPORT DIRECTION

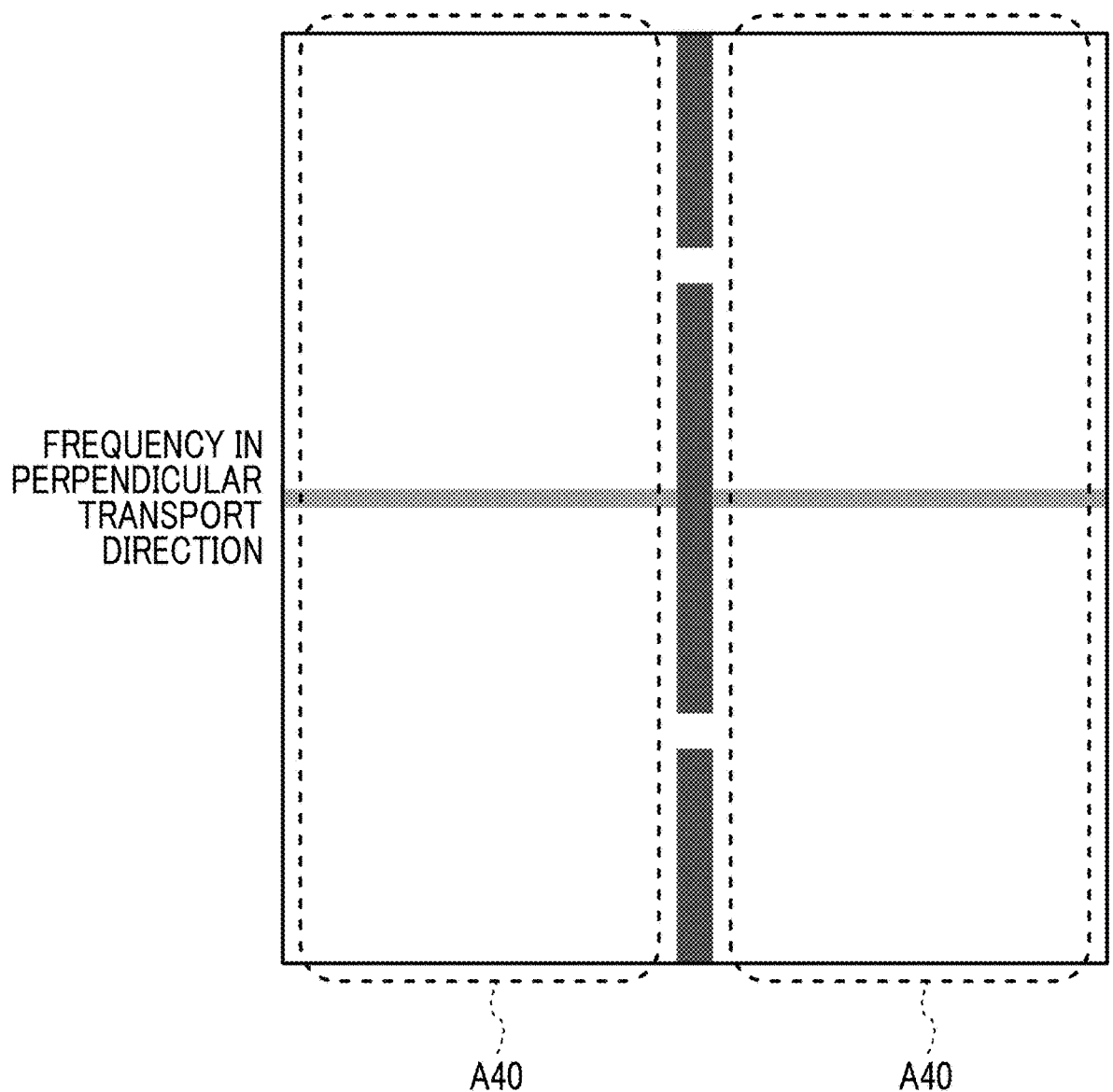

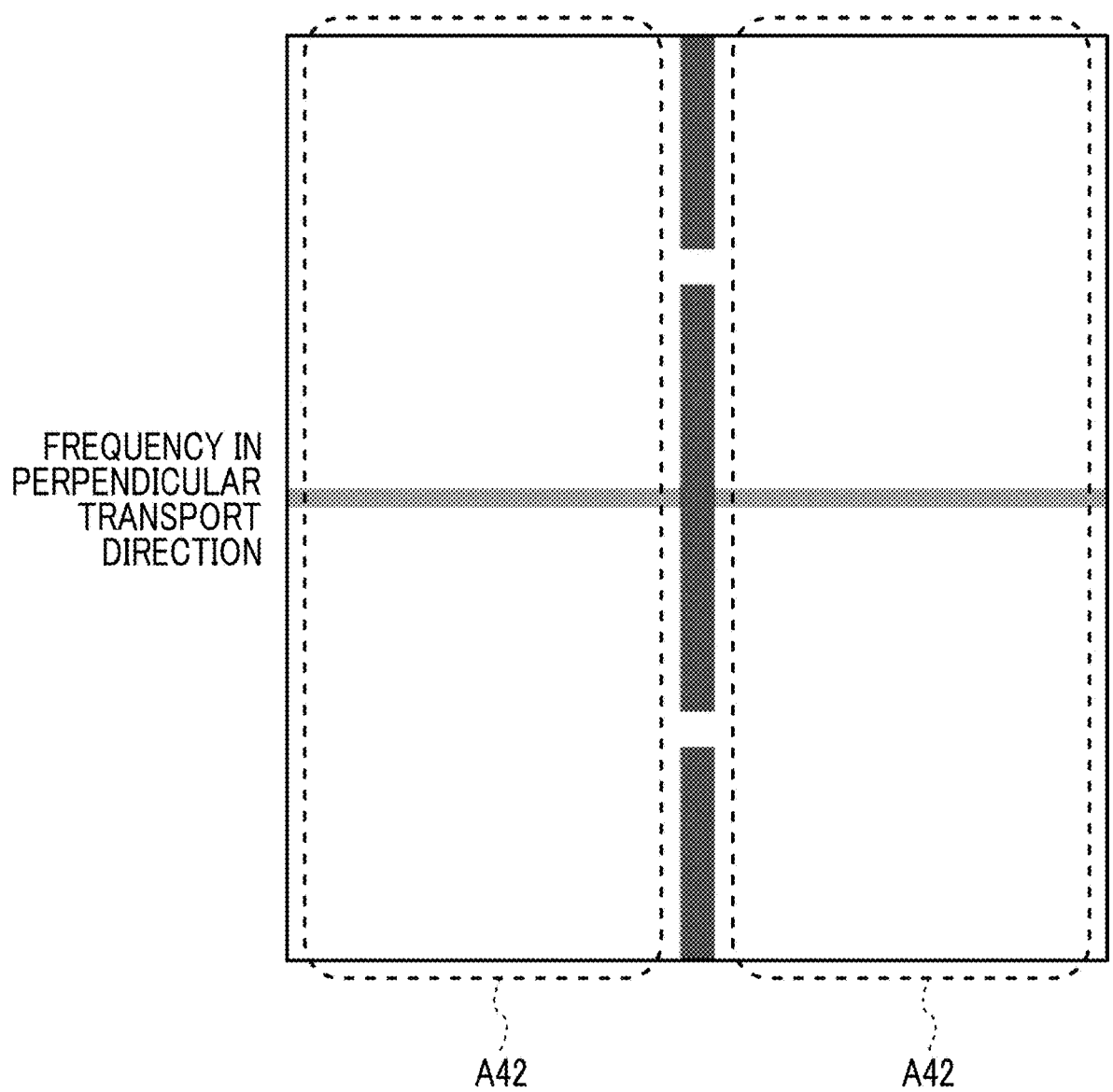

PRINT HEAD

PRINT MEDIUM

TRANSPORT DIRECTION

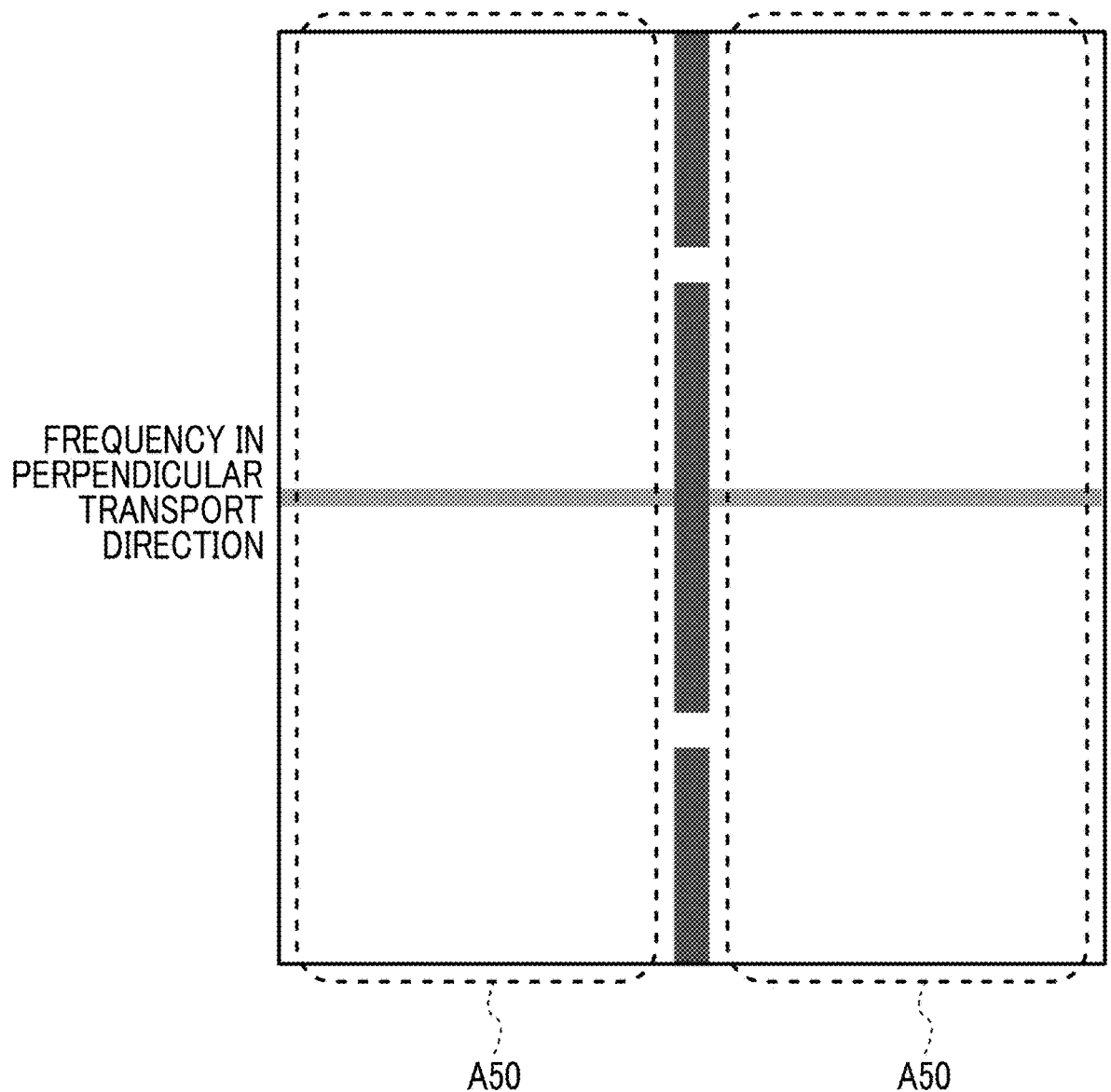

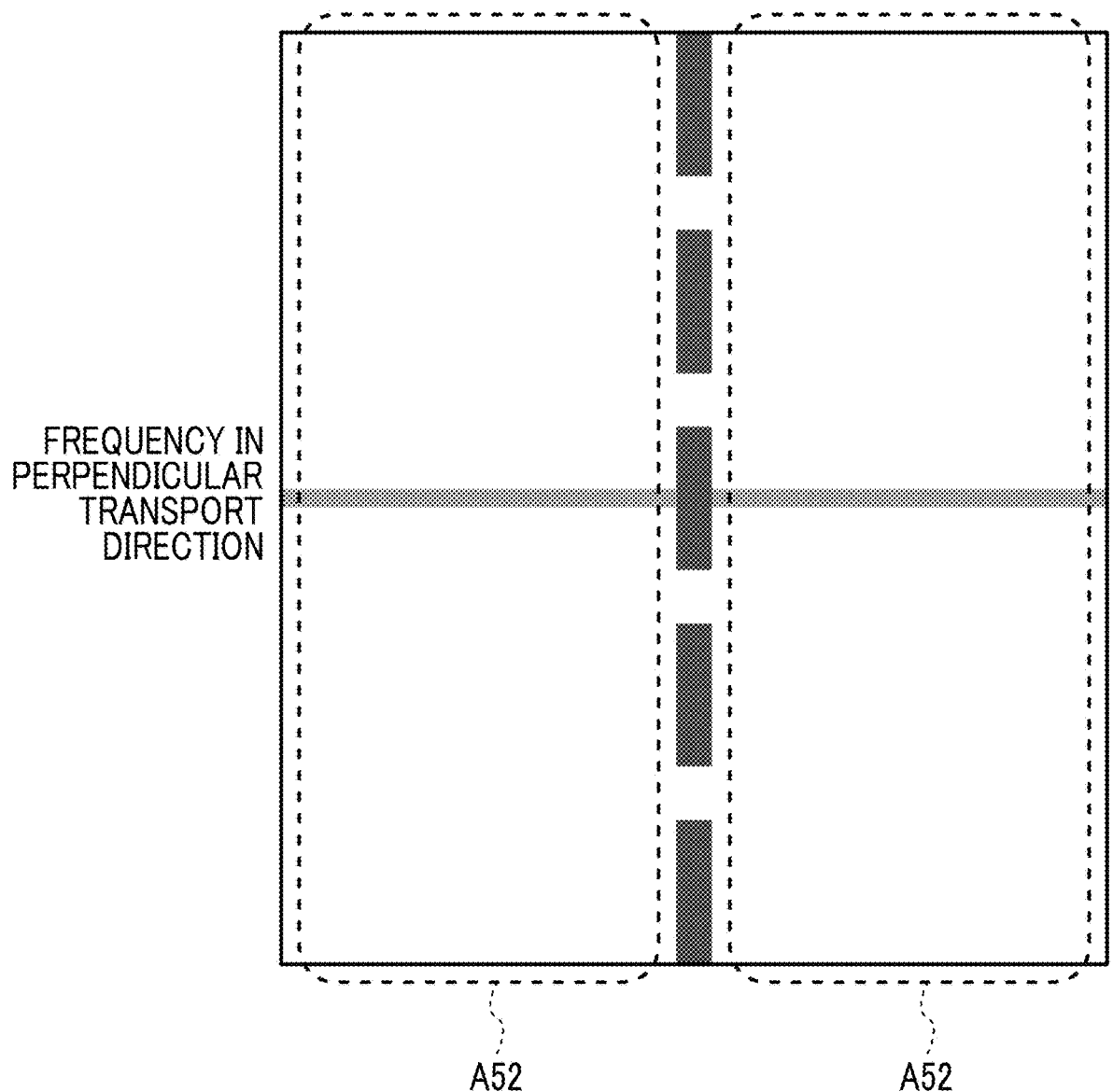

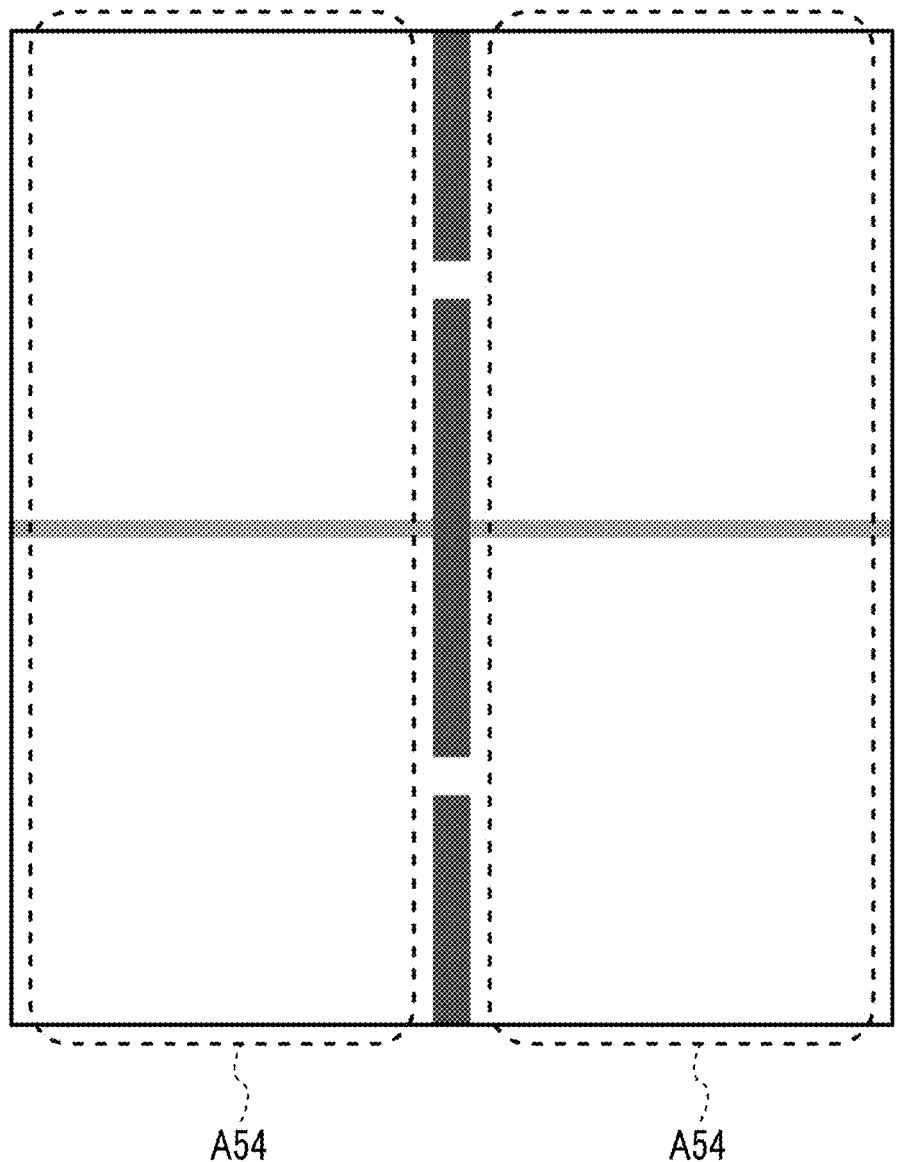

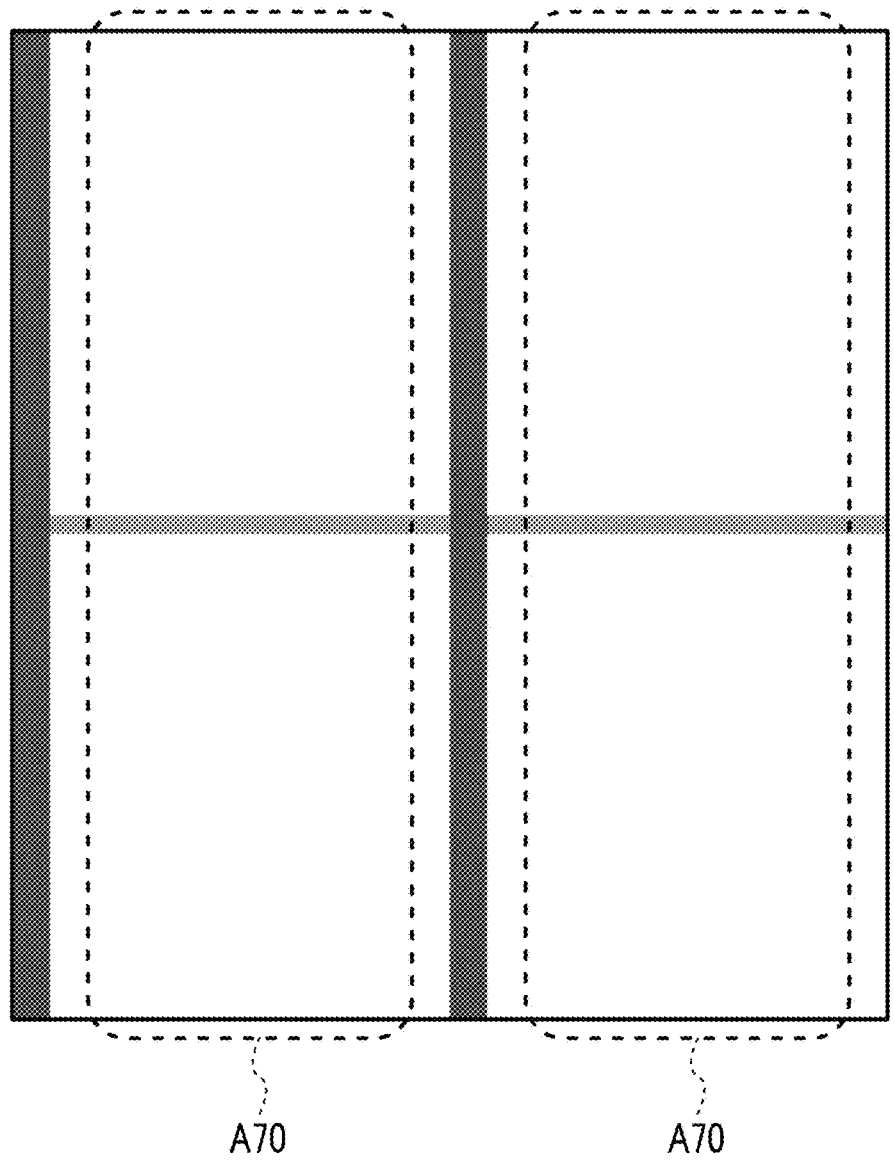

IMAGE PROCESSING METHOD, IMAGE PROCESSING DEVICE, AND IMAGE RECORDING APPARATUS FOR SUPPRESSION GENERATION OF BEATS

CROSS-REFERENCE TO RELATED APPLICATIONS

The present application is a Continuation of PCT International Application No. PCT/JP2018/012111 filed on Mar. 26, 2018 claiming priority under 35 U.S.C § 119(a) to Japanese Patent Application No. 2017-068556 filed on Mar. 30, 2017. Each of the above applications is hereby expressly incorporated by reference, in its entirety, into the present application.

BACKGROUND OF THE INVENTION

1. Field of the Invention

The present invention relates to an image processing method, an image processing device, and an image recording apparatus, and particularly to a halftone processing technique in which grayscale expression is performed by recording of dots by an ink jet recording apparatus.

2. Description of the Related Art

In ink jet recording apparatuses, an image is formed on paper by relatively moving a recording head in which a plurality of ink discharge ports (nozzles) are arranged and a print medium (paper) and discharging ink droplets from the nozzles. As the ink jet recording apparatuses, there single-pass type ink jet recording apparatuses that comprise an elongated line head including a nozzle array that covers the total range of a drawing region a paper width direction orthogonal to a transport direction of the paper and forms an image on the paper by relatively moving the paper only once with respect to the line head.

SUMMARY OF THE INVENTION

In the ink jet recording apparatuses, in a case where there is discharge abnormality, such as non-discharge and discharge bending, for each nozzle, streaky unevenness occurs in the transport direction of the paper. As a streaky unevenness correction technique for correcting such streaky unevenness, there is a method of lowering (or invisibilizing) the visibility of the streaky unevenness by masking (non-discharging) a nozzle of which the abnormality has been detected or correcting (modulating) density for each nozzle group. According to this streaky unevenness correction technique, since differences in density characteristics between the respective nozzle groups are corrected, the density of each nozzles group is equally uniformized.

The density of each nozzle group is expressed grayscales in the image on the paper by quantizing (halftone-processing) densities of continuous grayscales in an image to be recorded and modulating frequency dot to dot. However, since the density is modulated for each nozzle group in a case where the streaky unevenness correction is performed, the density of an input image of a quantization target has frequency characteristics according to the shapes of the nozzle groups. Also, in a case where the frequency characteristics according to the shapes of the nozzle groups and the frequency characteristics of the quantization are close to each other, recognizable beats (low-frequency component) are generated.

Here, the beats mean a phenomenon in which two waves with slightly different frequencies or numbers of frequencies interfere with each other, and a synthetic wave of which the amplitude varies slowly and periodically is generated. Human vision has lowered mountain-shaped spatial frequency characteristics (modulation transfer function (MTF) characteristics)) in a low-frequency range and a high-frequency range. For this reason, although neither a coarse stripe pattern nor a fine stripe pattern is easily in sight, a pattern of about 5 cycles/degree is most visible. That is, in a case where the streaky unevenness correction is performed, even in a case where the streaky unevenness is corrected by the density modulation, there are problems in that the recognizable beats are generated depending on a relationship between the frequency characteristics according to the shapes of the nozzle groups and the frequency characteristics of the quantization in an area where the density modulation has been performed by the streaky unevenness correction, and consequently correction of defects of the image is not appropriately performed (refer to JP2014-144610A).

JP2014-144610A discloses a technique in which artifacts between a plurality of first image regions are suppressed by correcting the image density of a pixel row adjacent to a pixel row corresponding to a defective recording element subjected to mask processing and by performing different quantizations on a first image region (defective recording element neighborhood region) including the pixel row corresponding to the defective recording element subjected to mask processing and the pixel row adjacent to the pixel row and a second image region (normal region) other than the first image region.

However, the technique described in JP2014-144610A is specialized in the non-discharge correction in a case where the same pixel row is printed by the same nozzle. For this reason, it is not possible cope with any nozzle layout shapes in which a correspondence relationship between the nozzles and the pixels on the paper is not one to one as in a case where the same pixel row is printed by a plurality of nozzles.

Moreover, the technique described in JP2014-144610A is specialized in non-discharge correction, and does not cope with any streaky unevenness correction other than the non-discharge correction. For this reason, in a case where the streaky unevenness correction other than the non-discharge correction is performed, there are problems in that the graininess of a correction part including the defective recording element neighborhood region where the streaky unevenness correction is performed deteriorates, and the invisibilization of the streaky unevenness is not appropriately performed.

Moreover, in a case where a nozzle layout shape becomes complicated, restrictions to the frequency characteristics increase only in the method of controlling the frequency characteristics of the quantization to suppress the beats. For this reason, there is a problem that the graininess deteriorates as a whole (that is, an entire image to be recorded on the paper including a non-correction part).

The invention has been made in view of such circumstances, and an object thereof is to provide an image processing method, an image processing device, and an image recording apparatus capable of suppressing generation of beats, even in a case where streaky unevenness correction other than non-discharge correction of a recording element is performed, in any nozzle layout shapes.

In order to solve the above problems, an image processing method related to a first aspect of the invention comprises an abnormality detection step of detecting an abnormality for each recording element in a recording head in which a plurality of the recording elements are arranged; an invisibilization step of a selecting a correction recording element including an abnormal recording element of which the abnormality has been detected, and modulating densities of pixels to be recorded on a recording medium by the correction recording element to invisibilize a defect of an image, in order to correct the defect of the image resulting from the abnormal recording element depending on a detection result in the abnormality detection step; and a quantization step of quantizing an image to be recorded on the recording medium, and performing the quantization such that a peak frequency component of the quantization is located in a frequency band excluding a frequency band around a spatial frequency peak of a correction region that is a pixel group to be recorded on the recording medium by the correction recording element of which a density has been modulated by the invisibilization step.

According to the first aspect, by changing the peak frequency component of the quantization depending on the spatial frequency peak of the correction region, it is possible to suppress generation of beats even in a case where streaky unevenness correction resulting from the abnormality of a recording element is applied in any nozzle layout shape.

The image processing method related to a second aspect of the invention based on the first aspect further comprises an image recording step of recording the image on the recording medium by the recording head on the basis of the quantized image, and in the image recording step, a pixel row on the recording medium is recorded by the plurality of recording elements of the recording head.

According to the second aspect, the suppression of the beats is possible even in a case where one column row is recorded by the plurality of recording elements.

In the image processing method related to a third aspect based on the first or second aspect, in the invisibilization step, the abnormal recording element of which non-discharge of ink has been detected is masked, and densities of pixels to be recorded by the correction recording element other than the abnormal recording element are modulated depending on relative positions from the masked abnormal recording element.

In the image processing method related to a fourth aspect based on any of the first to third aspects, densities of pixels to be recorded by the correction recording element are modulated depending on relative positions from the abnormal recording element of which discharge bending of ink has been detected.

In the image processing method related to a fifth aspect based on any of the first to fourth aspects, densities of pixels to be recorded by the correction recording element are modulated depending on modulation of the abnormal recording element of which modulation of a density has been detected, with respect to pixels to be recorded.

In the image processing method related to a sixth aspect based on any of the first to fifth aspects, a different quantization is performed for each correction recording element in the quantization step depending on contents of invisibilization performed for each correction recording element.

In the image processing method related to a seventh aspect based on the sixth aspect, in the invisibilization step, the abnormal recording element of which non-discharge of ink has been detected is masked, and densities of pixels to be recorded by the correction recording element other than the abnormal recording element are modulated depending on relative positions from the masked abnormal recording element, and in the quantization step, different quantizations are performed between the abnormal recording element and the correction recording element other than the abnormal recording element.

In the image processing method related to an eighth aspect based on any of the first to seventh aspect, in the quantization step, different quantizations are performed in a normal region that is pixels to be recorded on the recording medium by a normal recording element other than the correction recording element, and the correction region.

In the image processing method related to a ninth aspect based on the sixth aspect, in the invisibilization step, a degree of the modulation of a density is capable of being changed for each correction recording element, and in the quantization step, a different quantization is performed for each correction region corresponding to the correction recording element with the same degree of the modulation of the density.

In the image processing method related to a tenth aspect based on the sixth aspect, in the quantization step, quantization is performed by applying a different threshold matrix for each content of the invisibilization performed on the correction recording element.

In the image processing method related to an eleventh aspect based on the tenth aspect, in the quantization step, quantization is performed by applying a different threshold matrix for each correction region, and the threshold matrix is generated with reference to a common pattern in a case where the different threshold matrix is generated.

In the image processing method related to a twelfth aspect based on the sixth aspect, in the quantization step, a threshold matrix and error diffusion are used together, and proportions thereof vary for each correction region.

In the image processing method related to a thirteenth aspect based on the sixth aspect, in the quantization step, quantization is performed by applying different threshold matrices in a normal region that is pixels to be recorded on the recording medium by a normal recording element other than the correction recording element, and the correction region, and a threshold matrix to be applied to the correction region is generated by replacing a portion of a basic threshold matrix to be applied to the normal region.

An image processing device related to a fourteenth aspect of the invention comprises an invisibilization unit that selects a correction recording element including an abnormal recording element of which an abnormality has been detected, and modulates densities of pixels to be recorded on a recording medium by the correction recording element to invisibilize a defect of an image, in order to correct the defect of the image resulting from the abnormal recording element depending on a detection result obtained by detecting the abnormality for each recording element in a recording head in which a plurality of the recording elements are arranged; and a quantization unit that quantizes an image to be recorded on the recording medium, and performs the quantization such that a peak frequency component of the quantization is located in a frequency band excluding a frequency band around a spatial frequency peak of a correction region that is a pixel group to be recorded on the recording medium by the correction recording element of which a density has been modulated by the invisibilization unit.

The image recording apparatus related to the fifteenth aspect of the invention comprises a recording head for recording an image on a recording medium; and the image processing device according to the fourteenth aspect.

According to the invention, by changing the peak frequency component of the quantization depending on the spatial frequency peak of the correction region, it is possible to suppress the generation of the beats even in a case where the streaky unevenness correction resulting from the abnormality of a recording element is applied in any nozzle layout shape.

BRIEF DESCRIPTION OF THE DRAWINGS

FIG. 13 is a plan view schematically illustrating frequency characteristics of the correction region in the non-discharge correction method (1A).

FIG. 14 is a plan view schematically illustrating frequency characteristics of a normal correction region in the non-discharge correction method (1A).

FIG. 16 is a plan view schematically illustrating frequency characteristics of a high-density correction region in the non-discharge correction method (1B).

FIG. 17 is a plan view schematically illustrating frequency characteristics of a middle-density correction region in the non-discharge correction method (1B).

FIG. 20 is a plan view schematically illustrating frequency characteristics of the high-density correction region in the non-discharge correction method (1C-1).

FIG. 21 is a plan view schematically illustrating frequency characteristics of the low-density correction region in the non-discharge correction method (1C-1).

FIG. 22 is a plan view schematically illustrating frequency characteristics of a normal-density correction region in the non-discharge correction method (1C-1).

FIG. 24 is a plan view schematically illustrating frequency characteristics of the high-density correction region in the non-discharge correction method (1C-2).

FIG. 25 is a plan view schematically illustrating frequency characteristics of the normal-density correction region in the non-discharge correction method (1C-1).

FIG. 27 is a plan view schematically illustrating frequency characteristics of the high-density correction region in the non-discharge correction method (1D).

FIG. 28 is a plan view schematically illustrating frequency characteristics of the low-density correction region in the non-discharge correction method (1D).

FIG. 29 is a plan view schematically illustrating frequency characteristics of the normal-density correction region in the non-discharge correction method (1D).

FIG. 33 is a plan view schematically illustrating frequency characteristics of the correction region in the discharge bending correction method (2B).

DESCRIPTION OF THE PREFERRED EMBODIMENTS

Hereinafter, embodiments of an image processing method, an image processing device, and an image recording apparatus related to the invention will be described with respect to the accompanying drawings.

[Outline of Image Recording Apparatus]

Figure 1:
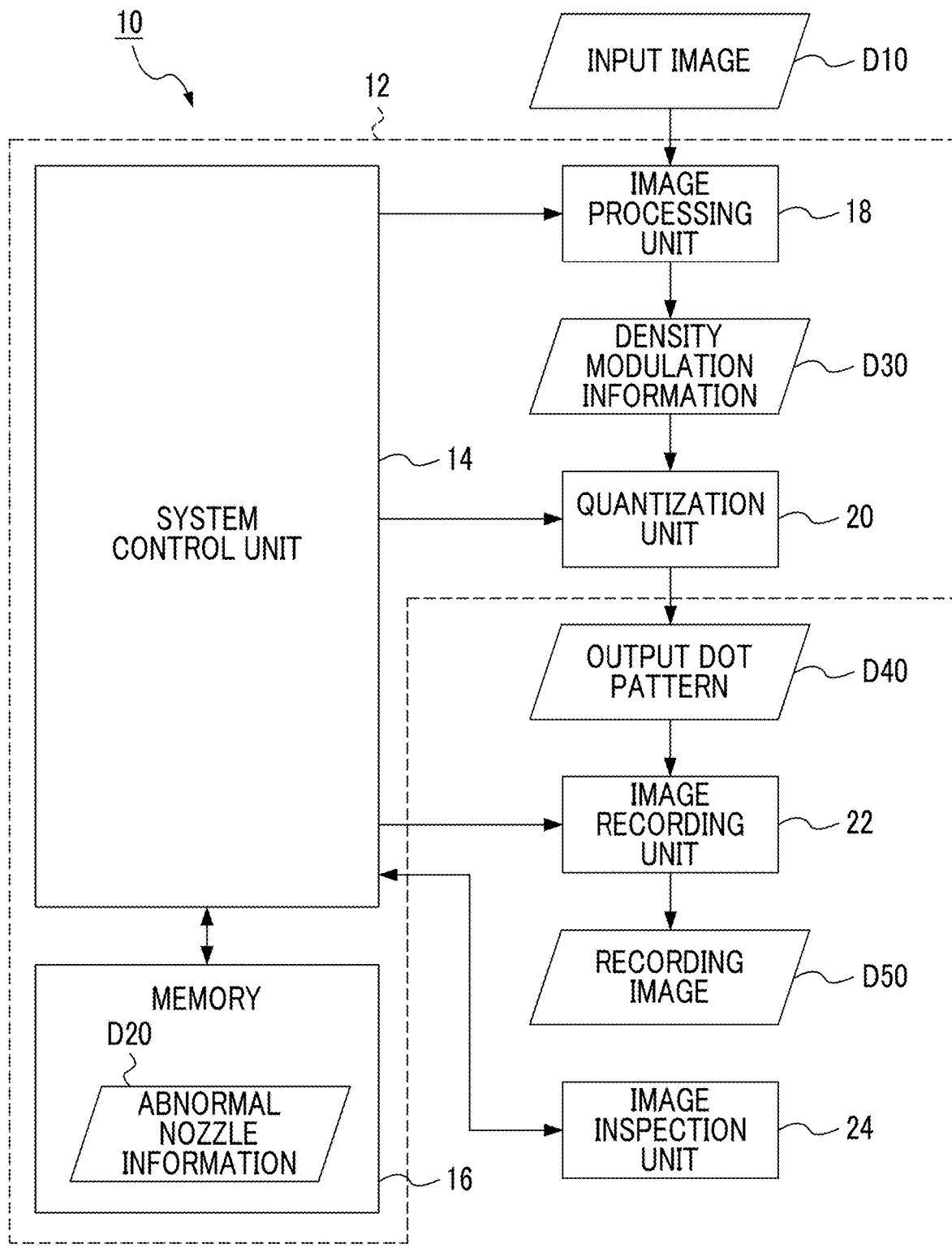
FIG. 1 is a block diagram of an image recording apparatus related to an embodiment of the invention.

FIG. 1 is a block diagram of an image recording apparatus related to an embodiment of the invention. In addition, an example in which the image recording apparatus related to the present embodiment is applied to a single-pass ink jet type image recording apparatus capable of recording an image with respect to one pixel row in a transport direction of a print medium (paper) with a plurality of recording elements (nozzles) will be described in the following description.

As illustrated in FIG. 1, the image recording apparatus 10 includes an image processor 12 for performing density correction (modulation) processing and quantization processing for invisibilizing streaky unevenness or the like of an image resulting from an abnormal recording element related to the present embodiment. The image processor 12 comprises a system control unit 14, a memory 16, an image processing unit 18, and a quantization unit 20. In addition to the respective components of the image processor 12, the image recording apparatus 10 further comprises an image recording unit 22 and an image inspection unit 24.

The system control unit 14 is a general control unit that controls the operation of the image recording apparatus 10. The system control unit 14 includes a processor that executes control programs stored in the memory 16 to perform various kinds of calculation, and outputs control signals to respective units of the image recording apparatus 10 to control the operation thereof.

The memory 16 includes a read only memory (ROM) and a random access memory (RAM) in which various kinds of control programs to be executed by the system control unit 14 are stored. Abnormal nozzle information (abnormal recording element information) D20 on abnormality of nozzles in a print head (recording head) provided in the image recording unit 22 is stored in the memory 16. Information (positional information or the like) for specifying a nozzle of which abnormality has been detected, and information showing the type (for example, on-discharge, a change in density, discharge bending, and the like) of abnormality and the degree of abnormality are included in the abnormal nozzle information D20.

The image processing unit 18 receives input of input image data D10 for being recorded on the print medium (paper), to perform various kinds of image processing on the input image data D10. For example, in a case where the input image data D10 is data of three primary colors of red (R), green (G), and blue (B), the image processing unit 18 converts the input image data D10 into data of respective colors of colors (for example, cyan (C), magenta (M), yellow (Y), and black (K)) of ink for the image recording unit 22. This color conversion processing can perform, for example, three primary colors of RGB, using a look-up table (LUT) for being converted into four colors of CMYK.

Additionally, the image processing unit 18 performs matching processing between the nozzles of the image recording unit 22 and pixels on the paper. Then, the image processing unit 18 performs gamma conversion (density modulation and streaky unevenness correction processing) for each nozzle group.

The image processing unit 18 functions as an invisibilization unit that performs the processing of performing masking or density modulation on an abnormal nozzle, and a correction nozzle (correction recording element) for correcting defects (streaky unevenness, artifacts, and the like) of an image resulting from the abnormal nozzle, to lower visibility of the defects of the image (invisibilize), on the basis of the abnormal nozzle information D20. Specifically, the image processing unit 18 masks (non-discharging) a non-discharge nozzle to perform density correction (density modulation) of nozzles around the masked nozzle to lower the visibility of the streaky unevenness resulting from the non-discharge nozzle. Additionally, regarding a discharge bending nozzle, the image processing unit 18 performs the density modulation of the discharge bending nozzle and nozzles therearound depending on the direction of discharge bending, to lower the visibility of defects of an image resulting from the discharge bending.

Here, the image processing unit 18 performs density correction for invisibilization processing, using parameters for the density correction, regarding the abnormal nozzle and the nozzles therearound. In the present embodiment, a pixel group recorded on the paper by a nozzle of which the density correction has been performed using the same parameter is referred to as a correction region (comp).

The quantization unit 20 performs the quantization processing (halftone processing) on the input image data D10 which has been subjected to the image processing such as the color conversion processing and the invisibilization processing by the image processing unit 18, so as to reduce the number of grayscales (gradations) of the input image data D10. The quantization unit 20 converts, for example, image data of 256 grayscales into data of the number of grayscales capable of being recorded by the image recording unit 22 to create an output dot pattern D40. In the present embodiment, the number of grayscales capable of being recorded by the image recording unit 22 is described as 4 grayscales (no droplet, a small droplet, a middle droplet, and a large droplet), and the number of grayscales is not limited to this. In addition, this quantization processing is performed for each color (for example, for each of CMYK) capable of being recorded by the image recording unit 22.

The quantization unit 20 performs the quantization so as to have a peak frequency component of the quantization in a frequency band excluding a near frequency band of a spatial frequency peak of the correction region that is the pixel group recorded on the paper by the nozzle subjected to the invisibilization processing. Here, the peak frequency is a frequency of which an amplitude component in a frequency space in a case where the two-dimensional Fourier transform is performed becomes relatively higher (excluding the 0th frequency component that is an average value of an image). More specifically, the peak frequency is a frequency band that has an amplitude of less than about 5% from a maximum value of an amplitude value excluding the 0th frequency component in the frequency space.

The image recording unit 22 comprises a print head (refer to FIG. 3A) for discharging ink of each color of CMYK to the paper (a recording medium or the print medium), and transporting means (for example, a drum for suctioning the paper to transport in a transport direction of the paper, a driving mechanism for rotating a drum, or the like) for relatively moving the paper and the print head. Hence, the image recording unit 22 discharges ink of respective colors onto the paper from the print head in accordance with the output dot pattern D40, and records an image on the paper.

The image inspection unit 24 comprises an imaging unit for imaging a recording image D50 recorded on the paper. As the imaging unit, a scanner can be provided on a transport route of the paper. The recording image D50 captured by the image inspection unit 24 is sent to the system control unit 14.

The system control unit 14 analyzes the recording image D50 captured by the image inspection unit 24, and updates the abnormal nozzle information D20 in a case where the abnormal nozzle is newly detected. Additionally, the system control unit 14 reflects the analysis results of the recording image D50 on the invisibilization processing and the quantization processing.

[Outline of Image Processing Method]

Figure 2:
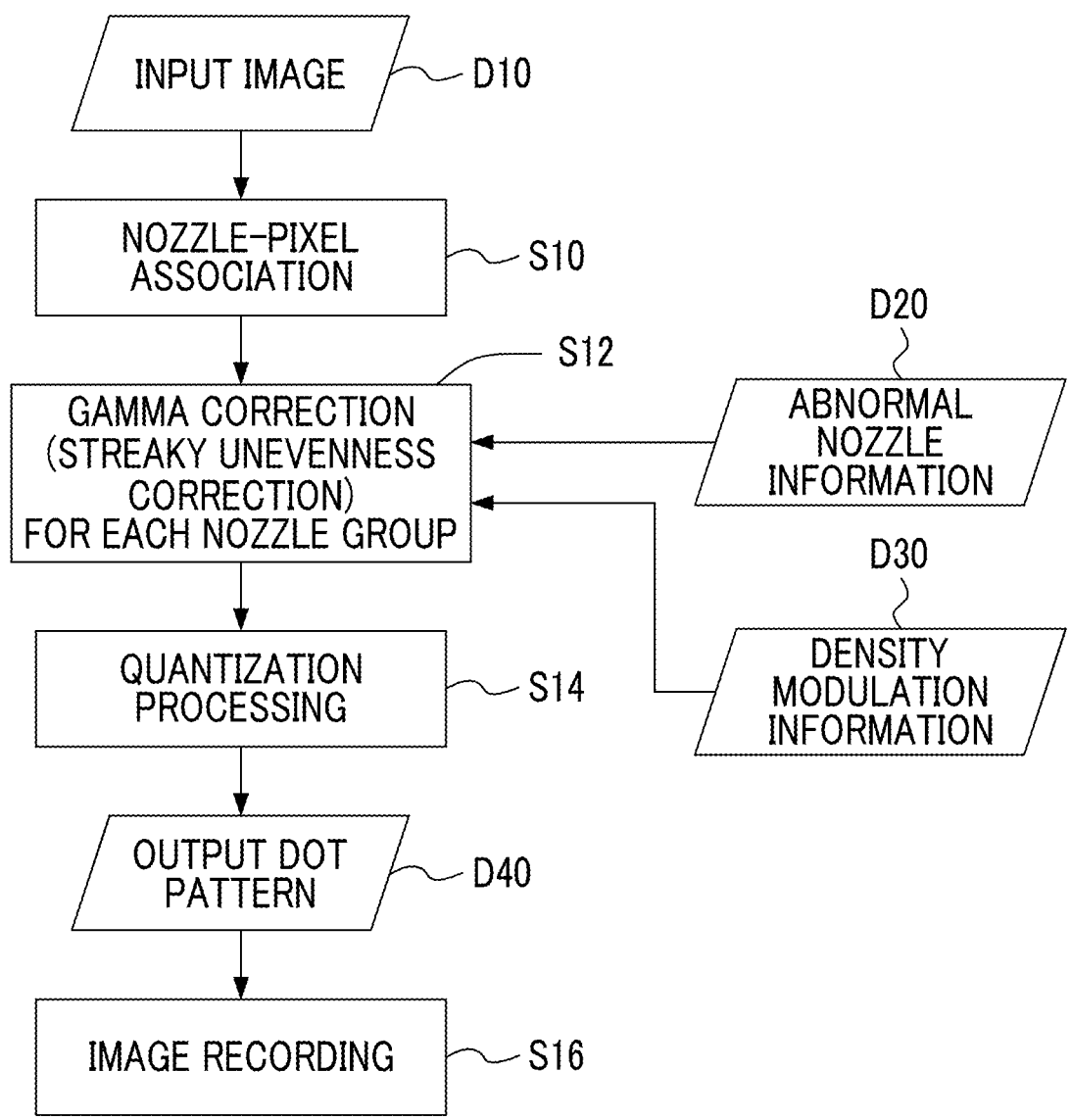
FIG. 2 is a flowchart illustrating a flow of an image processing method related to the embodiment of the invention.

FIG. 2 is a flowchart illustrating a flow of the image processing method related to the embodiment of the invention.

As illustrated in FIG. 2, in a case where the input image data D10 recorded on the paper is input, the image processing unit 18 performs the matching processing between the nozzles of the image recording unit 22 and the pixels on the paper (Step S10). Then, the image processing unit 18 performs the gamma conversion (the density modulation and the streaky unevenness correction processing) for each nozzle group on the basis of the abnormal nozzle information D20 and density modulation information D30 (Step S12, an invisibilization step).

Next, the quantization unit 20 quantizes the input image data D10 subjected to the gamma conversion in Step S12, and outputs the output dot pattern D40 (Step S14, a quantization step).

The image recording unit 22 records an image on the paper in accordance with the output dot pattern D40 (Step S16, an image recording step).

By capturing the image recorded with the recording image D50 by the image inspection unit 24, creation and updating of the abnormal nozzle information D20 can be performed (abnormality detection step).

In a case where the density is modulated for each nozzle group by the image processing including the gamma conversion for the correction of the streaky unevenness, an image before the quantization has frequency characteristics according to the shape (the correction region on the paper) of the nozzle group. Since recognizable beats are generated in a case where the frequency characteristics and the frequency characteristics of the quantization are close to each other, the image deteriorates. In the present embodiment, the frequency characteristics of the quantization do not belong to the frequency characteristics of the density-modulated nozzle group and a frequency band therearound. Accordingly, it is possible to perform suitable streaky unevenness correction while preventing correction of the recognizable beats.

[Positional Relationships Between Nozzles and Print Media and Frequency Characteristic of Nozzle Map Patterns]

Next, positional relationships between nozzles and pixels on print media, and frequency characteristics of nozzle map patterns will be described. In the following description, a print head in which nozzles are arranged in a zigzag fashion (staggered pattern) will be described as an example.

FIGS. 3A and 3B are views illustrating a positional relationship between nozzles and pixels on a print medium. FIG. 3A illustrates an arrangement of the nozzles in the print head, and FIG. 3B is a plan view illustrating the pixels recorded on paper by the nozzles of FIG. 3A.

Symbols given to the nozzles of FIG. 3A respectively correspond to symbols of the pixels of FIG. 3B. FIG. 3A illustrates a portion of the arrangement of the nozzles of the print head, and the nozzles are disposed in the zigzag fashion in four rows×four columns. As illustrated in FIG. 3B, pixel rows of eight columns are recorded on the print medium by the nozzles of this zigzag fashion. That is, each pixels column in a paper transport direction (sub-scanning direction) is recorded by two nozzles.

In FIG. 3B, in the same pixel group indicated by the same symbols, the density correction is performed with the same parameters. In the following description, regions that are divided depending on pixel groups of which the densities are corrected with the same parameters are referred to as correction regions.

Spatial frequencies of the respective correction regions in the example of FIGS. 3A and 3B can be obtained as follows. First, a parameter 1 is allocated to a pixel group of a targeted correction region, and a parameter 0 is allocated to non-targeted pixels. For example, in the example of FIG. 3A, in a case where a spatial frequency of a correction region of a nozzle C1 is obtained, 1 is allocated to C1 and 0 is allocated to those other than C1. Next, a spectrum is calculated by Fourier-analyzing a two-dimensional array to which this parameter is allocated.

Figure 3:
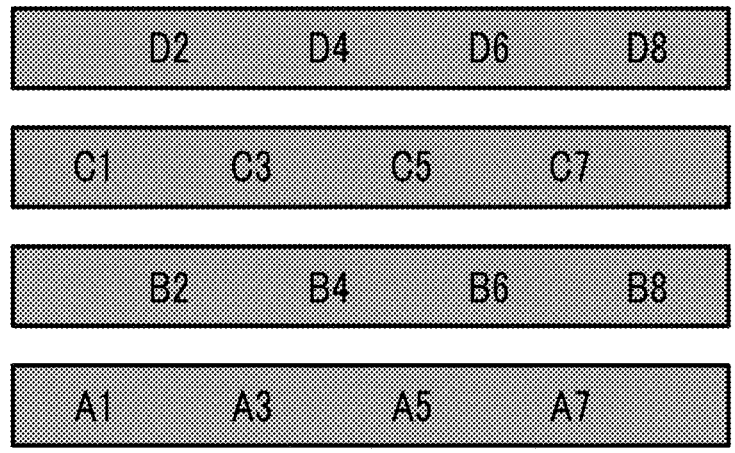
FIGS. 3A and 3B are views illustrating a positional relationship between nozzles and pixels on a print medium.
Figure 4:
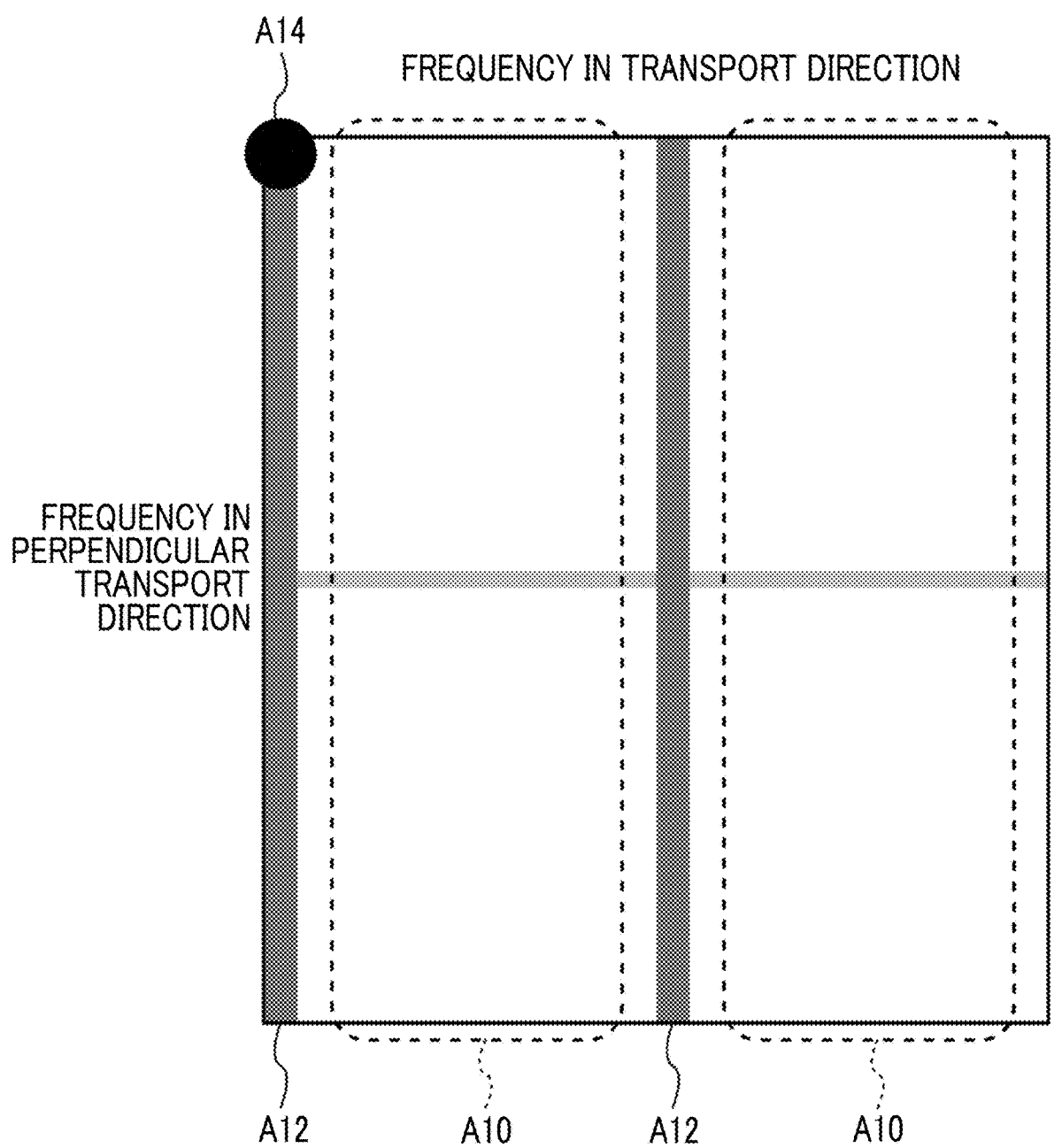
FIG. 4 is a plan view schematically illustrating frequency characteristics of a correction region.

FIG. 4 is a plan view schematically illustrating frequency characteristics of a nozzle map pattern. In the example in which the nozzles are arranged in the zigzag fashion of FIG. 3A, as illustrated in FIG. 4, the largest spatial frequency component is generated at a corner (black dot part A14) of which the Nyquist frequency is high. Also, a small component is generated by a zero frequency (a region illustrated in gray within a region A12) in the transport direction and a Nyquist frequency component.

In order to suppress the generation of the recognizable beats, a peak frequency may be disposed in a spot that is not covered with the frequency characteristics of the divided correction regions. For this reason, quantization having has a peak within a region A10 of FIG. 4 is performed.

Particularly, since there is a strong frequency component of a correction region around the black dot part A14, it is preferable to move away (suppress) the frequency component of the quantization in a region around the black dot part A14.

In addition, it is preferable that the frequency band, which is not covered with the frequency characteristics of the correction regions, is a band that is at least 5 cycles/mm or more away from the peak of the spatial frequency of the nozzle group. The frequency characteristics of beats to be generated are determined depending on a difference between the spatial frequency of the nozzle group and the peak frequency of the quantization. Human eyes are likely to visually recognize the beats particularly in the frequencies of this range. Hence, in order to avoid the strong frequency component of the correction region, the generation of the beats can be effectively suppressed by more greatly shifting the peak of the frequency of the quantization.

Figure 5:
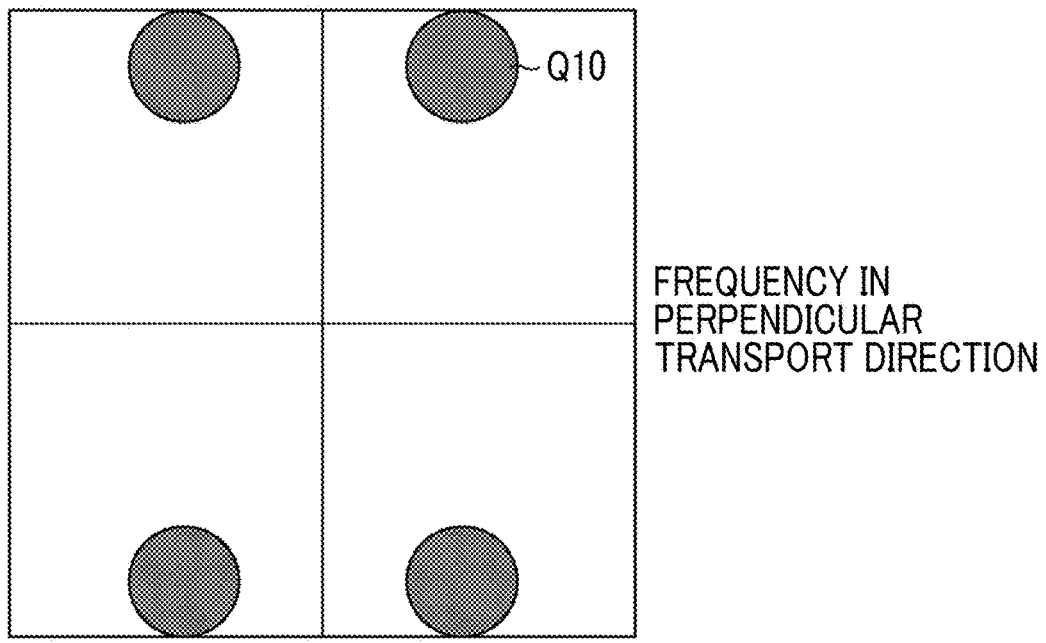
FIG. 5 is a view illustrating a preferable example of a peak frequency band in quantization.
Figure 6:
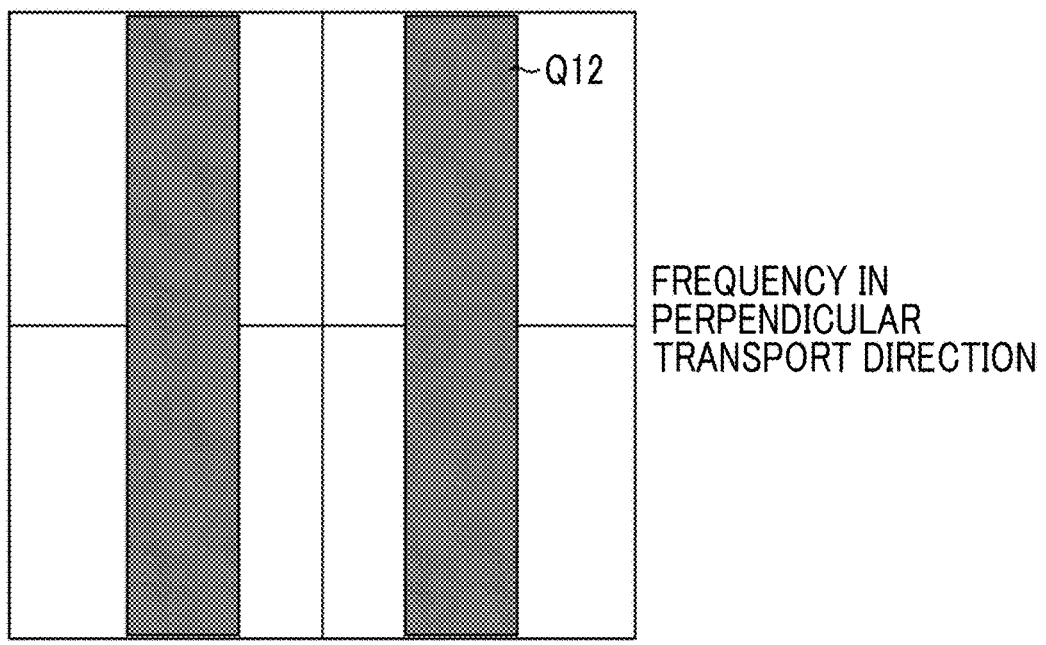
FIG. 6 is a view illustrating a preferable example of the peak frequency band in the quantization.
Figure 7:
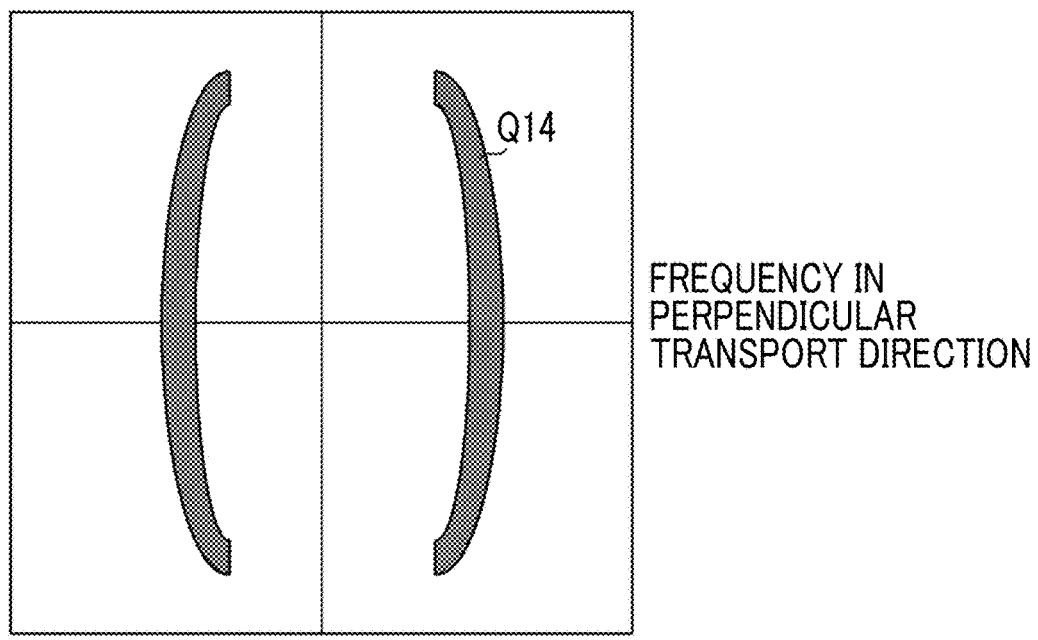
FIG. 7 is a view illustrating a preferable example of the peak frequency band in the quantization.
Figure 8:
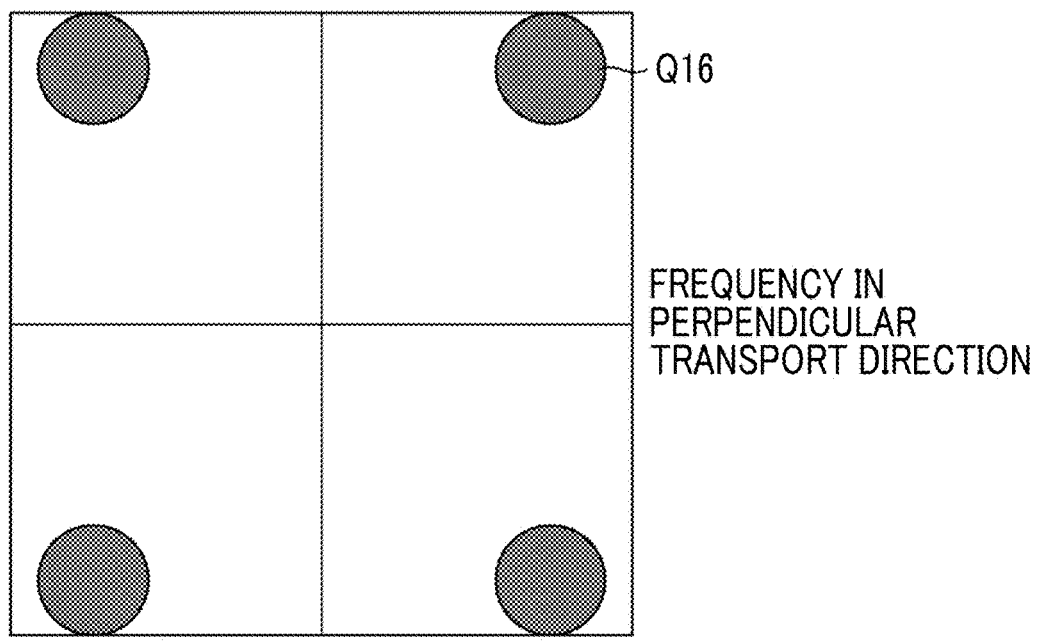
FIG. 8 is a view illustrating a non-preferable example of the peak frequency band in the quantization.
Figure 9:
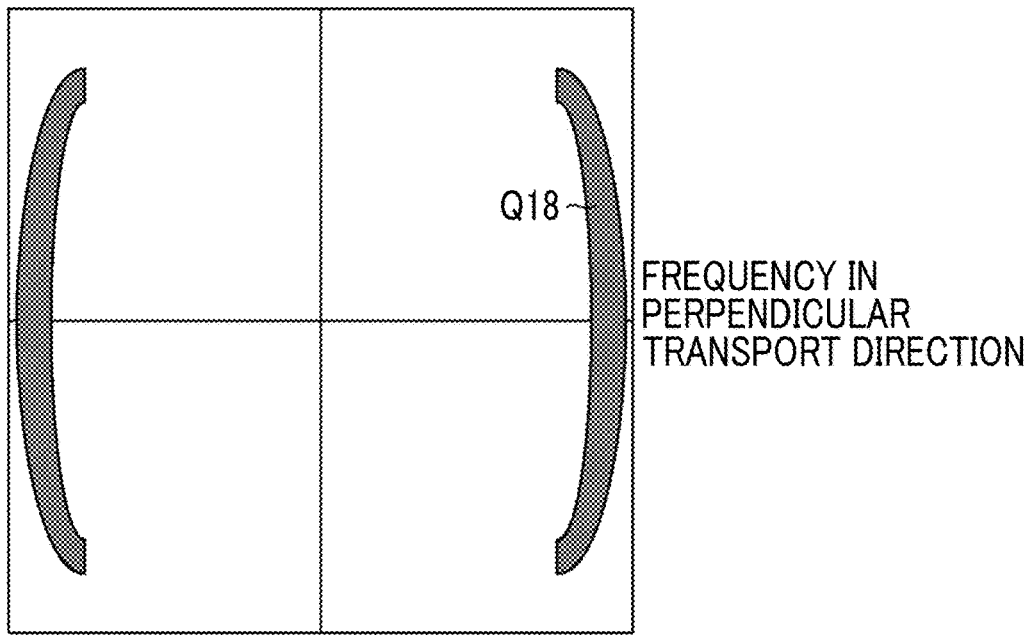
FIG. 9 is a view illustrating a non-preferable example of the peak frequency band in the quantization.
Figure 10:
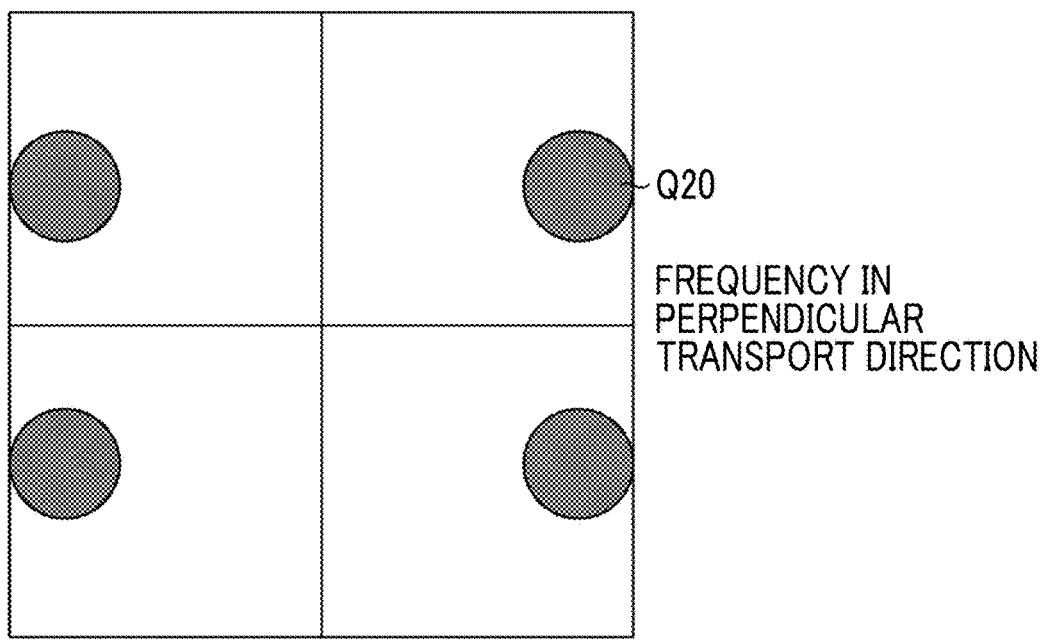
FIG. 10 is a view illustrating a non-preferable example of the peak frequency band in the quantization.
Figure 11:
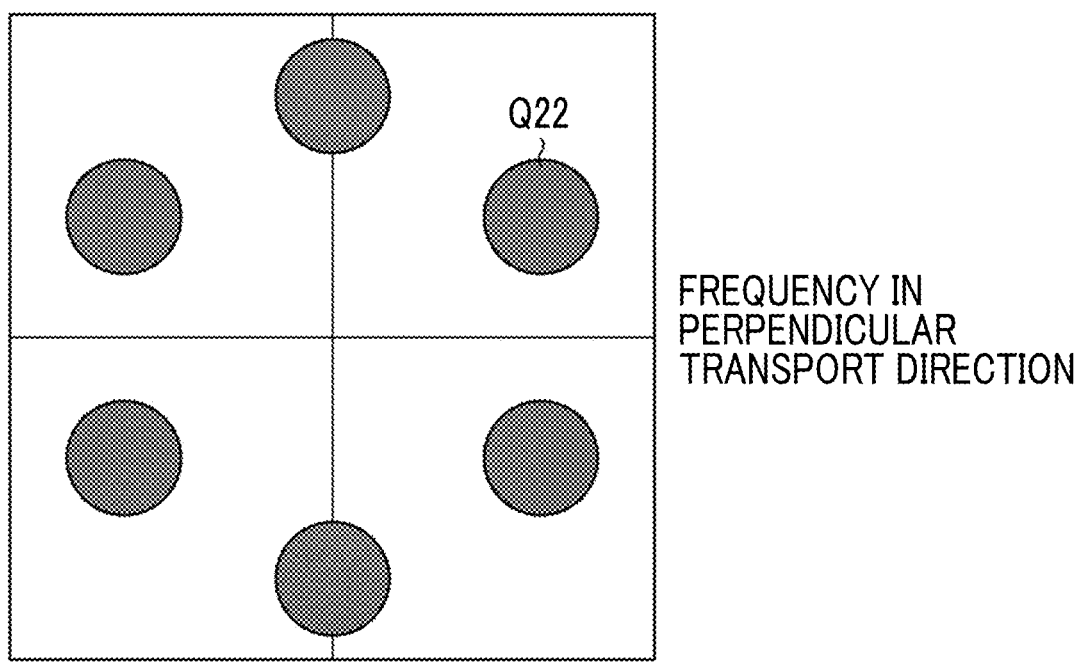
FIG. 11 is a view illustrating a non-preferable example of the peak frequency band in the quantization.

FIGS. 5 to 7 are views illustrating preferable examples of the peak frequency band in the quantization, and FIGS. 8 to 11 are views illustrating non-preferable examples of the peak frequency band in the quantization.

In FIGS. 5 to 11, peak frequency bands in the quantization are illustrated as regions Q10 to Q22, respectively.

All regions Q10 to Q14 illustrated in FIGS. 5 to 7 fall within in regions A10 illustrated in FIG. 4. On the other hand, since all regions Q16 to Q22 illustrated in FIGS. 8 to 11 spread to the outsides of the regions A10, the recognizable beats are likely to be generated.

[Non-Discharge Correction]

Next, characteristics of nozzle groups for respective correction methods will be described. First, a streaky unevenness correction method in a case where there is a non-discharge nozzle will be described. In the following example, a case where a nozzle B4 is a non-discharge nozzle and the non-discharge nozzle B4 is masked (non-discharged) is shown.

Figure 12A:
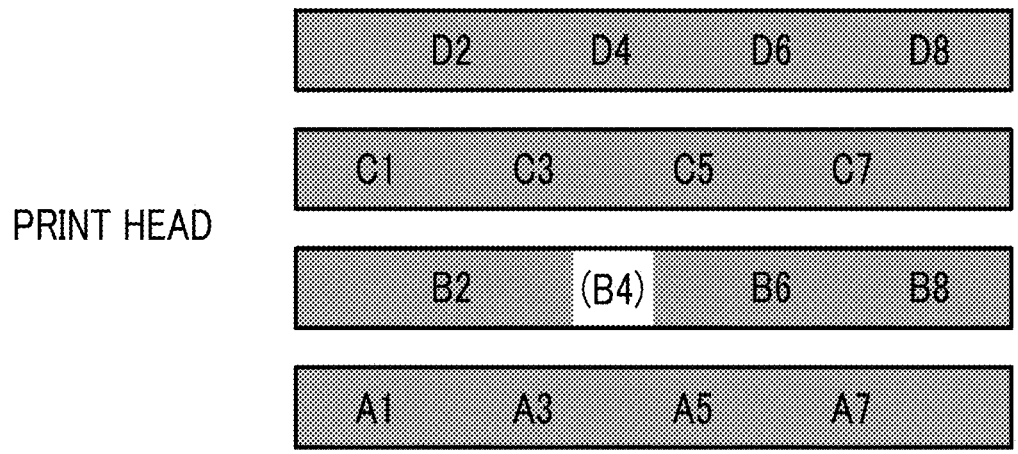
FIGS. 12A and 12B are views illustrating a positional relationship between nozzles and pixels on a print medium in a non-discharge correction method (1A).
Figure 12B:
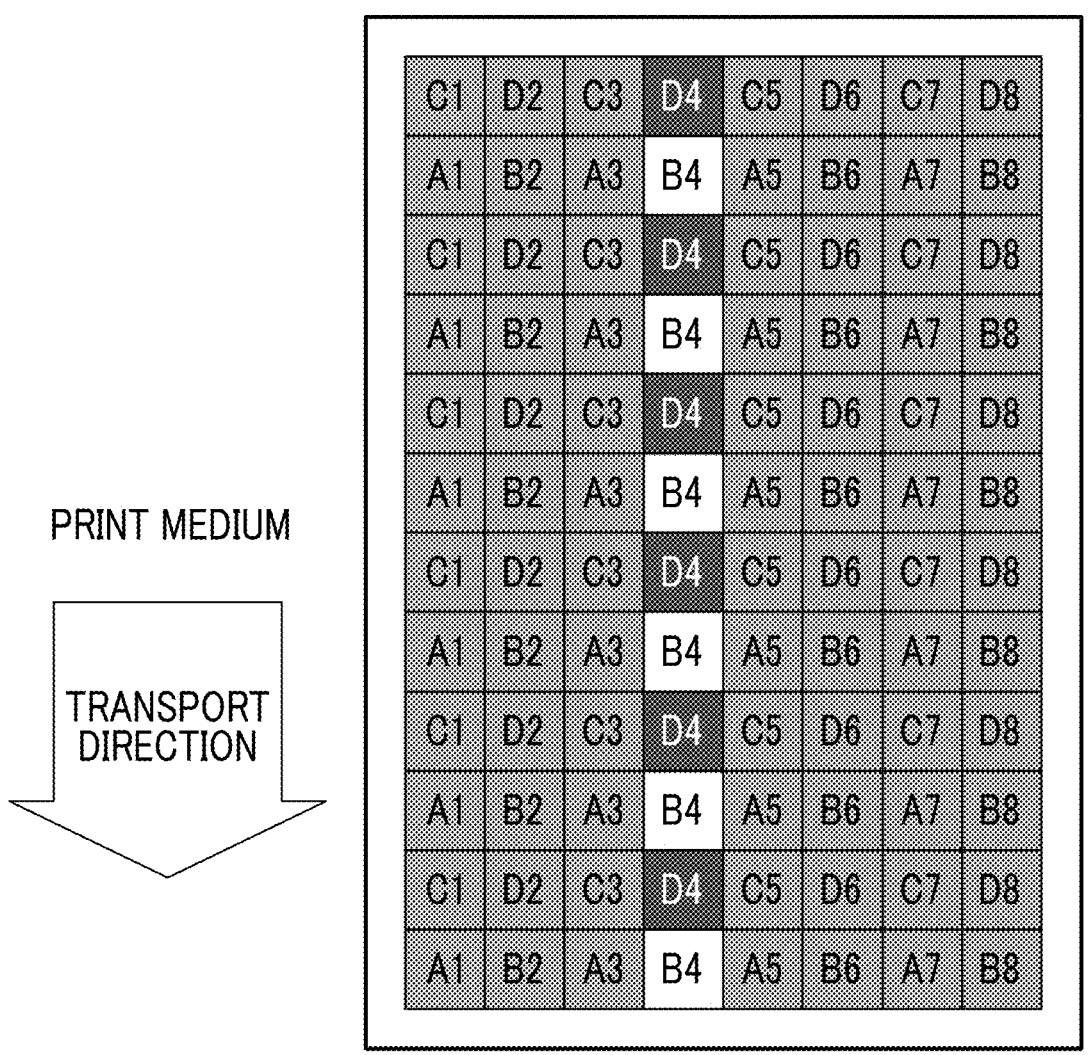

In a method (1A) illustrated in FIGS. 12A and 12B, the masked nozzle B4 is corrected only by one nozzle D4.

Figure 15A:
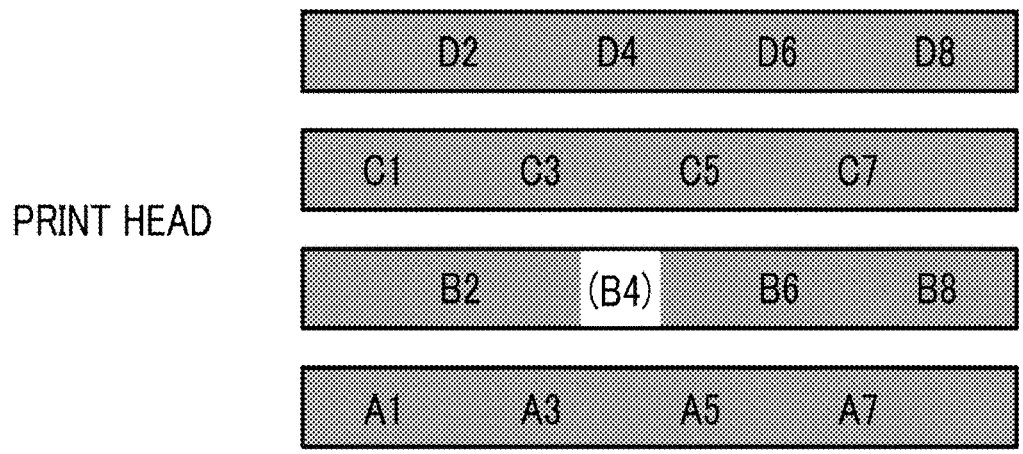
FIGS. 15A and 15B are views illustrating a positional relationship between nozzles and pixels on a print medium in a non-discharge correction method (1B).
Figure 15B:
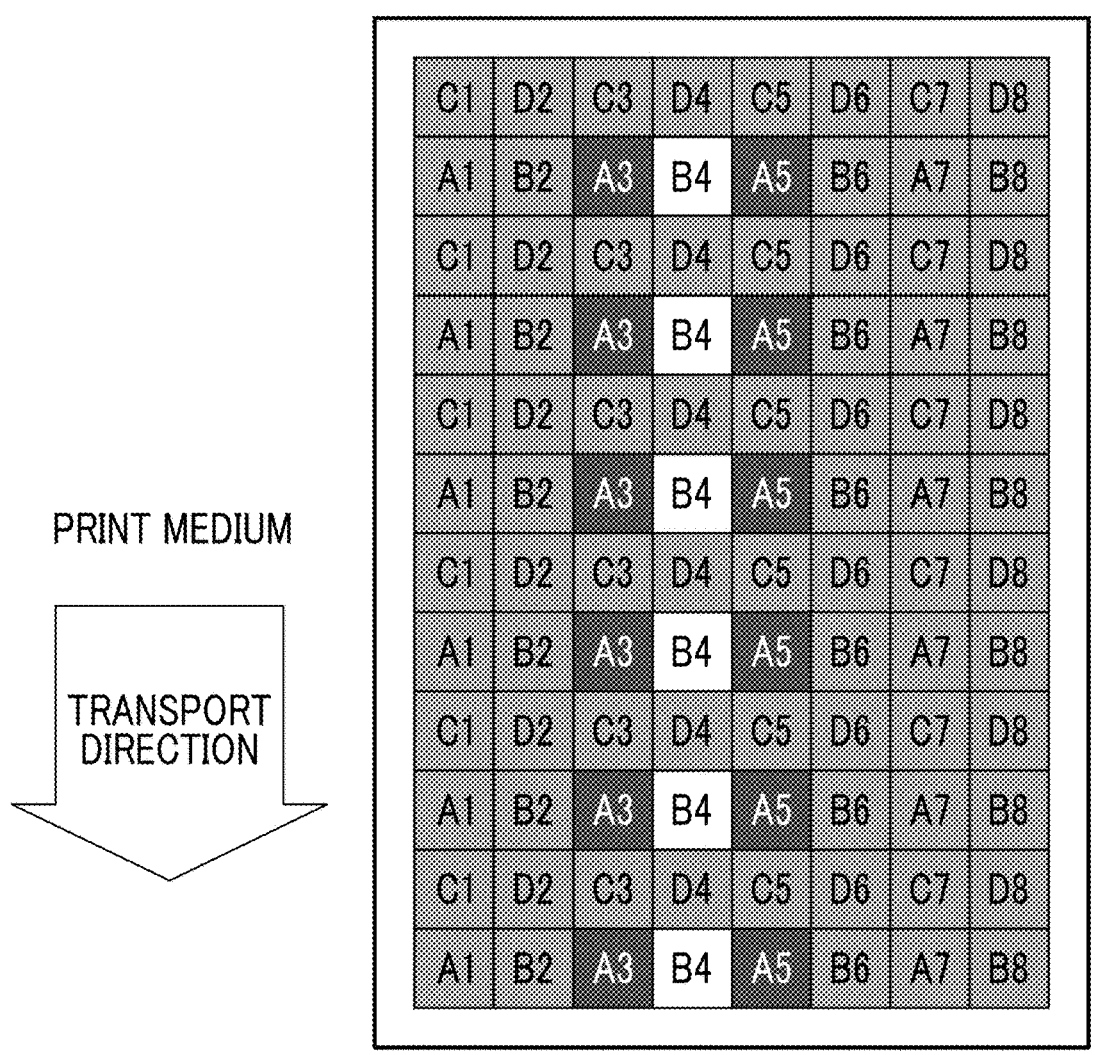

In a method (1B) illustrated in FIGS. 15A and 15B, the densities of two nozzles A3 and A5 that record pixels, which are adjacent to each other in a perpendicular transport direction with respect to a pixel position recorded by the nozzle B4, are corrected with the same parameters.

Figure 18A:
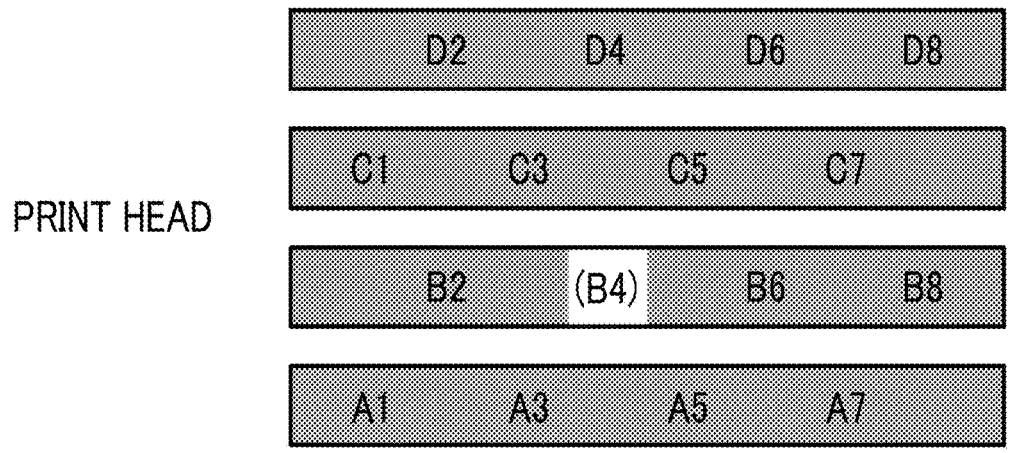
FIGS. 18A and 18B are views illustrating a positional relationship between nozzles and pixels on a print medium in a non-discharge correction method (1C-1).
Figure 18B:
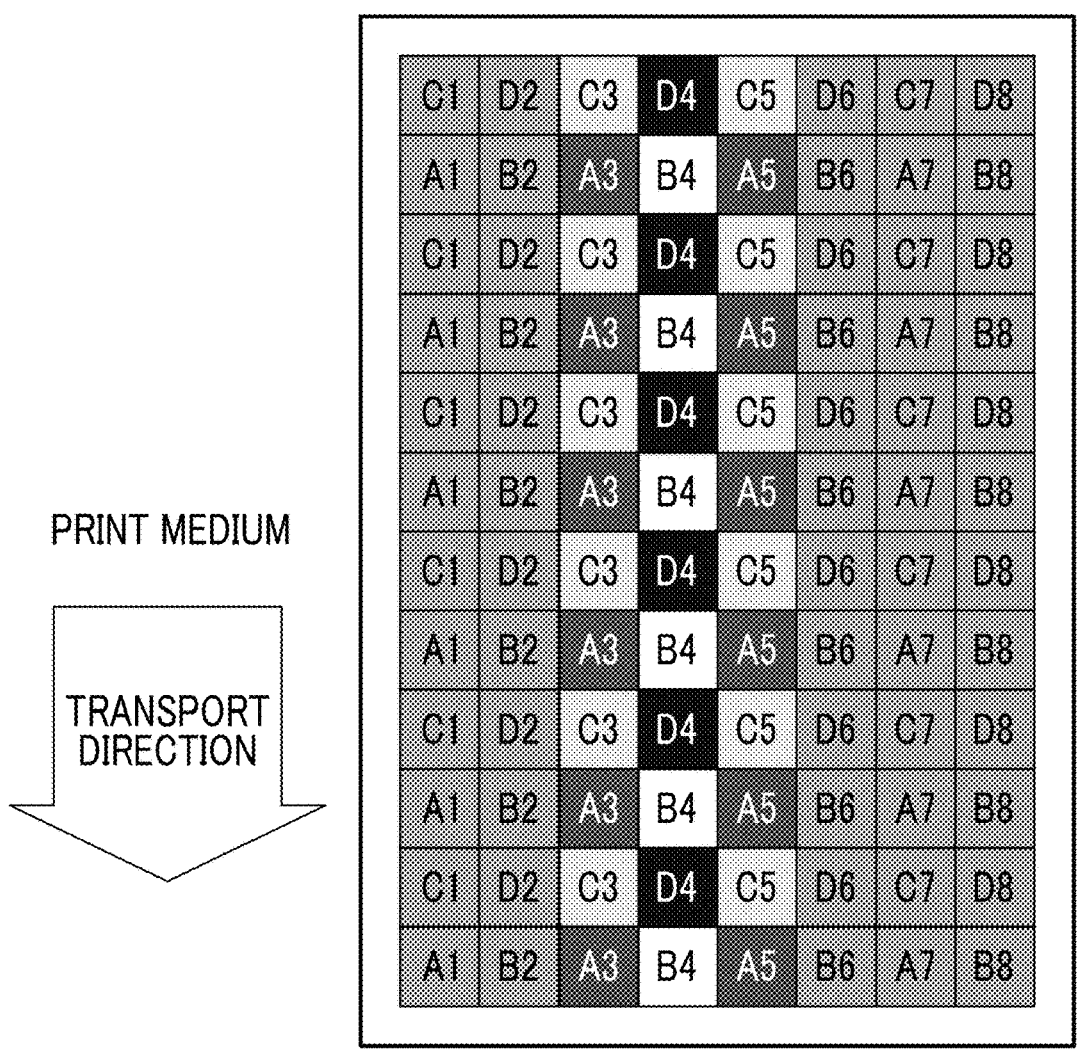
Figure 19:
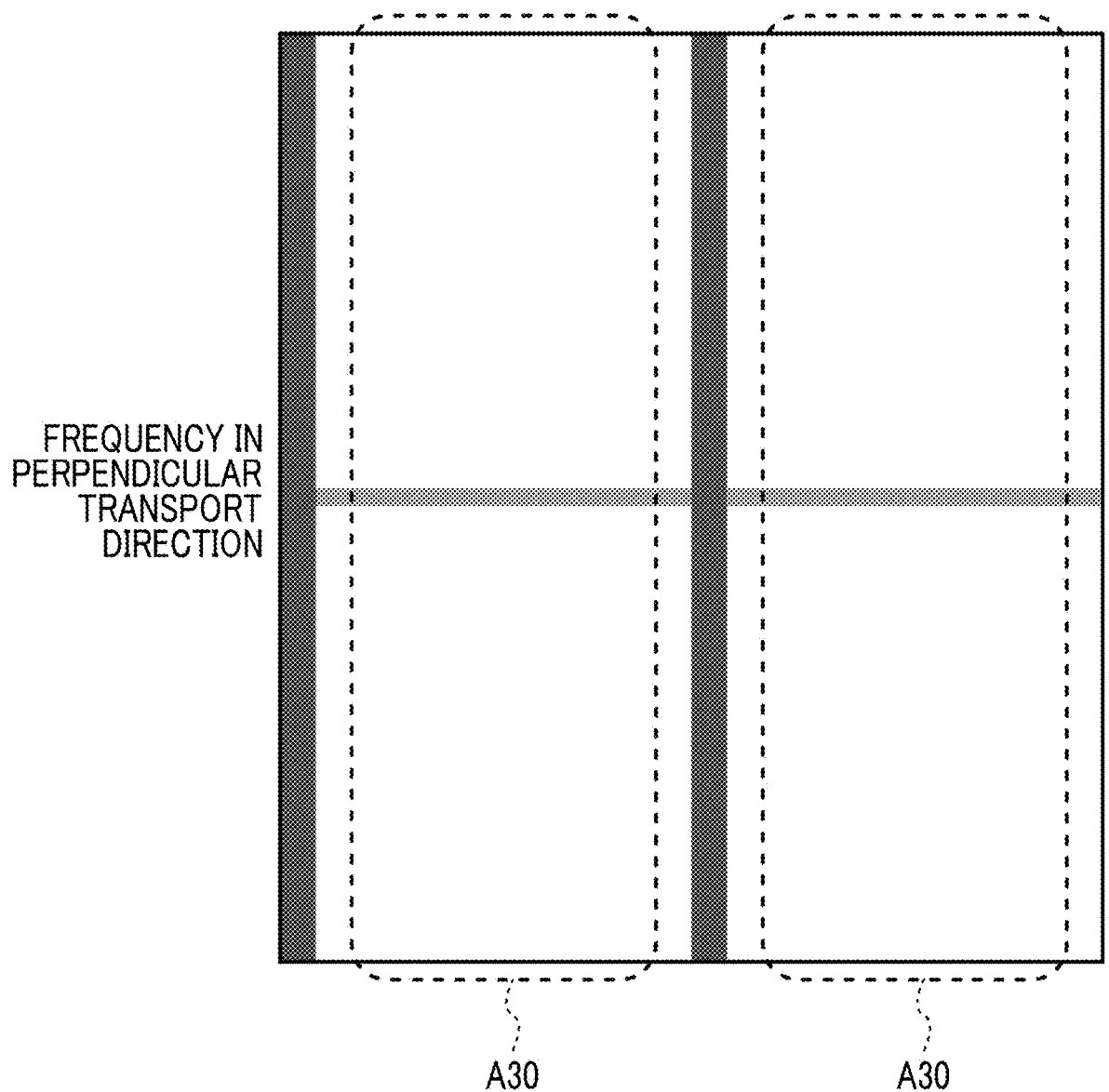
FIG. 19 is a plan view illustrating schematically frequency characteristics of a highest-density correction region in the non-discharge correction method (1C-1).

In a method (1C-1) illustrated in FIGS. 18A and 18B, the densities of nozzles A3, A5, D4, C3, C5 are corrected with the same parameters, respectively.

Figure 23A:
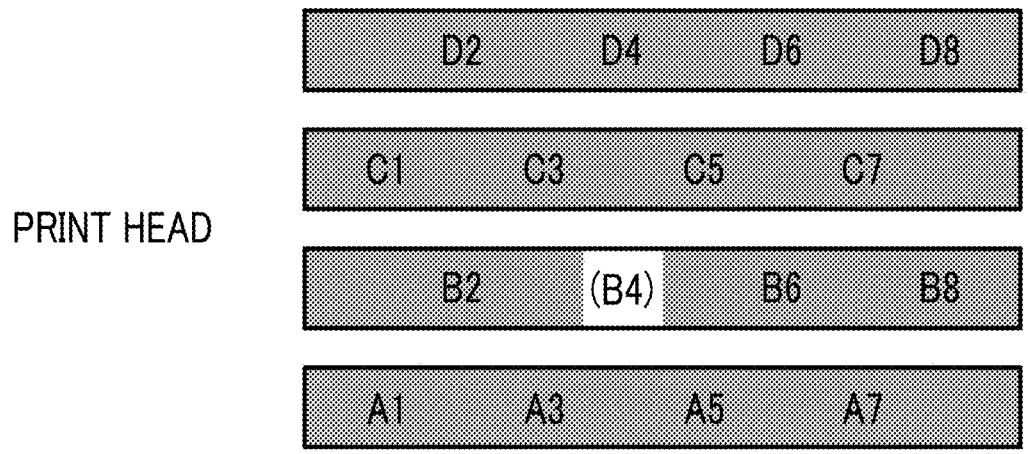
FIGS. 23A and 23B are views illustrating a positional relationship between nozzles and pixels on a print medium in a non-discharge correction method (1C-2).
Figure 23B:
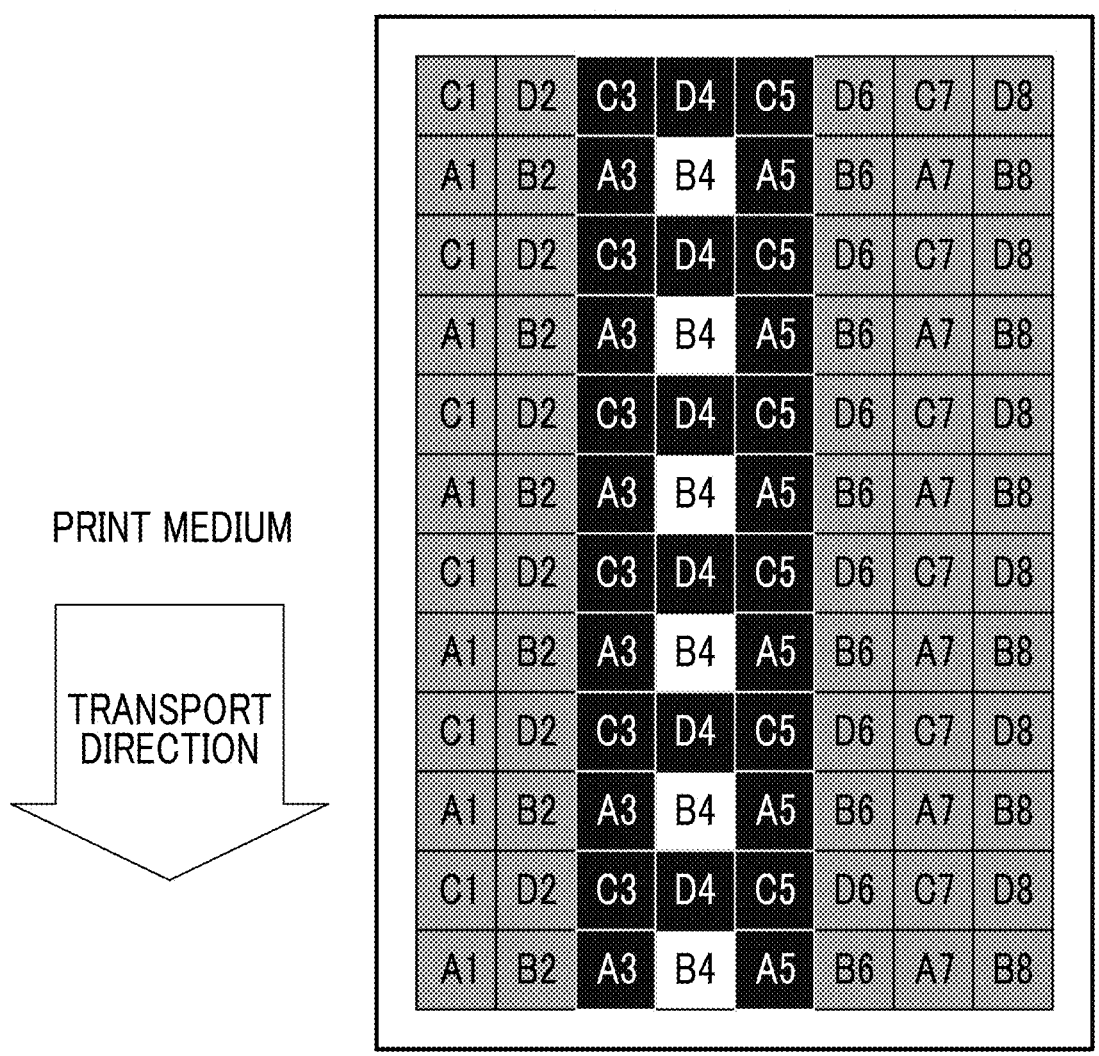

A method (1C-2) illustrated in FIGS. 23A and 23B sums regions A3, A5, D4, and C3 that had been separately corrected by the methods (1C-1) and C5, and correction is performed by regarding the summed region as the same correction region. A change in the shape of such a correction region can be carried out by changing the degree of the modulation of a density depending on a relative position with a defective nozzle. Since the degree of the modulation of the density can be changed for each grayscale, for example, since the streaky unevenness is relatively easily conspicuous on a lower density side, a method with a smaller number of correction nozzles (for example, the method (1A)) is used. On the other hand, since the streaky unevenness is relatively easily conspicuous on a higher density side, it is possible to adopt methods (for example, the method (1C-1) or (1C-2)) with smaller numbers of correction nozzles and grayscales.

In this way, the frequency characteristics of the correction regions in a case where correction is performed depending on the nozzle groups can be obtained as follows. First, the parameter 1 is allocated to the pixels of the target correction region, and the parameter 0 is allocated to the other pixels. For example, in the method (1C-2) illustrated in FIGS. 23A and 23B, in a case where correction regions illustrated in dark gray are obtained, 1 is allocated to pixels A3, D4, and A5, and 0 is allocated to the other pixels.

Next, the Fourier analysis of the parameters allocated to the respective pixels is performed. Accordingly, a spectrum is calculated.

As illustrated in FIGS. 12 to 29, in a case where the correction methods (shapes of control nozzle groups) are changed, the frequency characteristics of the nozzle groups also vary. As quantization methods, it is possible to take alternatives, such as a method of fixing the quantization limited to a specific correction method, a method of adopting a quantization method in which beats are not generated with all the correction methods (for example, giving a peak component of the frequency of the quantization to a common portion of all regions A10 to A54 illustrated in FIGS. 12 to 29), or a method of changing the quantization methods depending on the correction method.

In the method (1A) illustrated in FIGS. 12A and 12B, a defective nozzle (an abnormal recording element, a correction recording element) B4 is masked, and the correction nozzle (correction recording element) D4 to be used for the density correction is density-modulated (made to have a higher density). Also, the normal nozzles (normal recording elements) A1, A3, A5, A7, B2, B6, B8, C1, C3, C5, C7, D2, D6, and D8 in which abnormality is not detected and the density modulation is also not performed are not density-modulated.

In the method (1A), the spatial frequency characteristics of pixel groups (high-density correction regions) recorded by the correction nozzle D4 made to have a higher density are as illustrated in FIG. 13. On the other hand, the spatial frequency characteristics of pixel groups (normal regions) recorded by the normal nozzles are as illustrated in FIG. 14.

Hence, the generation of the beats can be suppressed by performing the quantization such that the peak component of the frequency of the quantization of the pixels to be recorded by each nozzle may be given to the regions A10 and regions A12 that are illustrated in FIGS. 13 and 14.

In the method (1B) illustrated in FIGS. 15A and 15B, the defective nozzle B4 is masked, and the correction nozzles A3 and A5 to be used for the density correction are density-modulated (made to have a higher density). Also, the normal nozzles other than the nozzles B4, A3, and A5 are not density-modulated.

In the method (1B), the spatial frequency characteristics of high-density correction regions that are pixel groups recorded by the correction nozzles A3 and A5 made to have a higher density are as illustrated in FIG. 16, and the spatial frequency characteristics of pixel groups (normal regions or middle-density correction regions) to be recorded by the normal nozzles other than the defective nozzle B4 and the correction nozzles A3 and A5 are as illustrated in FIG. 17.

Hence, the generation of the beats can be suppressed by performing the quantization such that the peak component of the frequency of the quantization of the pixels to be recorded by each nozzle is given to the regions A10 illustrated in FIG. 13 and regions A20 and regions A22 that are illustrated in FIGS. 16 and 17.

In the method (1C-1) illustrated in FIGS. 18A and 18B, the defective nozzle B4 is masked, and the correction nozzle D4 has the highest density so as to have the density modulation. The correction nozzles A3 and A5 are density-modulated so as to have a higher density next to the nozzle D4 and the correction nozzles C3 and C5 are density-modulated so as to have a lower density than the normal nozzles. Also, the normal nozzles A1, A7, B2, B6, B8, C1, C7, D2, D6, and D8 are not density-modulated.

In the method (1C-1), spatial frequency characteristics of a highest-density correction region corresponding to the correction nozzle D4 having the highest density, a high-density correction region corresponding to the correction nozzles A3 and A5 having a higher density next to D4, a low-density correction region corresponding to the correction nozzles C3 and C5 having a lower density than the normal nozzles, and a normal-density correction region corresponding to the normal nozzles are illustrated in FIGS. 19 to 22, respectively.

Hence, the generation of the beats can be suppressed by performing the quantization such that the peak component of the frequency of the quantization of the pixels to be recorded by each nozzle is given to the regions A10 illustrated in FIG. 13 and regions A30 and A36 that are illustrated in FIGS. 19 to 22.

In the method (1C-2) illustrated in FIGS. 23A and 23B, the defective nozzle B4 is masked, the correction nozzles A3, A5, C3, C5, and D4 are made to have a higher density, and the normal nozzles A1, A7, B2, B6, B8, C1, C7, D2, D6, and D8 are not density-modulated.

In the method (1C-2), the spatial frequency characteristics of a high-density correction region corresponding to the correction nozzles A3, A5, C3, C5, and D4 made to have a higher density, and a normal-density correction region corresponding to the normal nozzles are as illustrated in FIGS. 24 and 25, respectively.

Hence, the generation of the beats can be suppressed by performing the quantization such that the peak component of the frequency of the quantization of the pixels to be recorded by each nozzle is given to the regions A10 illustrated in FIG. 13 and regions A40 and regions A42 that are illustrated in FIGS. 24 and 25.

Figure 26A:
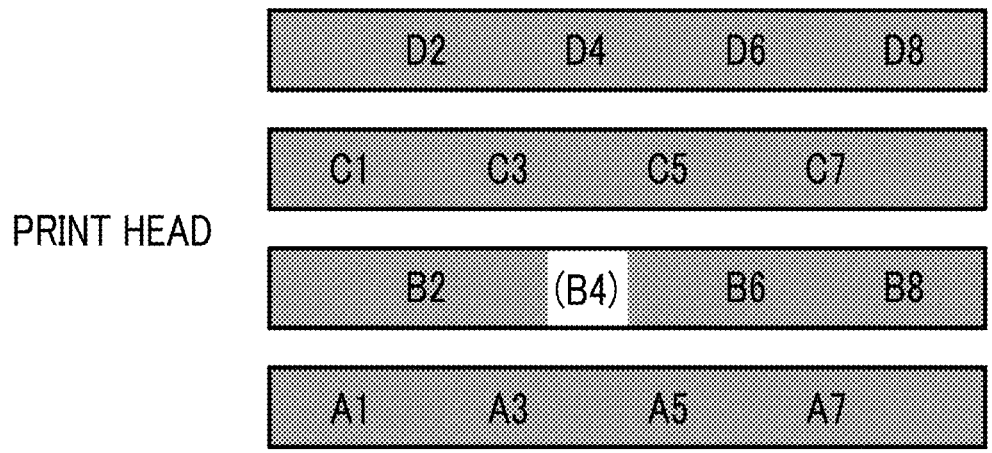
FIGS. 26A and 26B are views illustrating a positional relationship between nozzles and pixels on a print medium in a non-discharge correction method (1D).
Figure 26B:
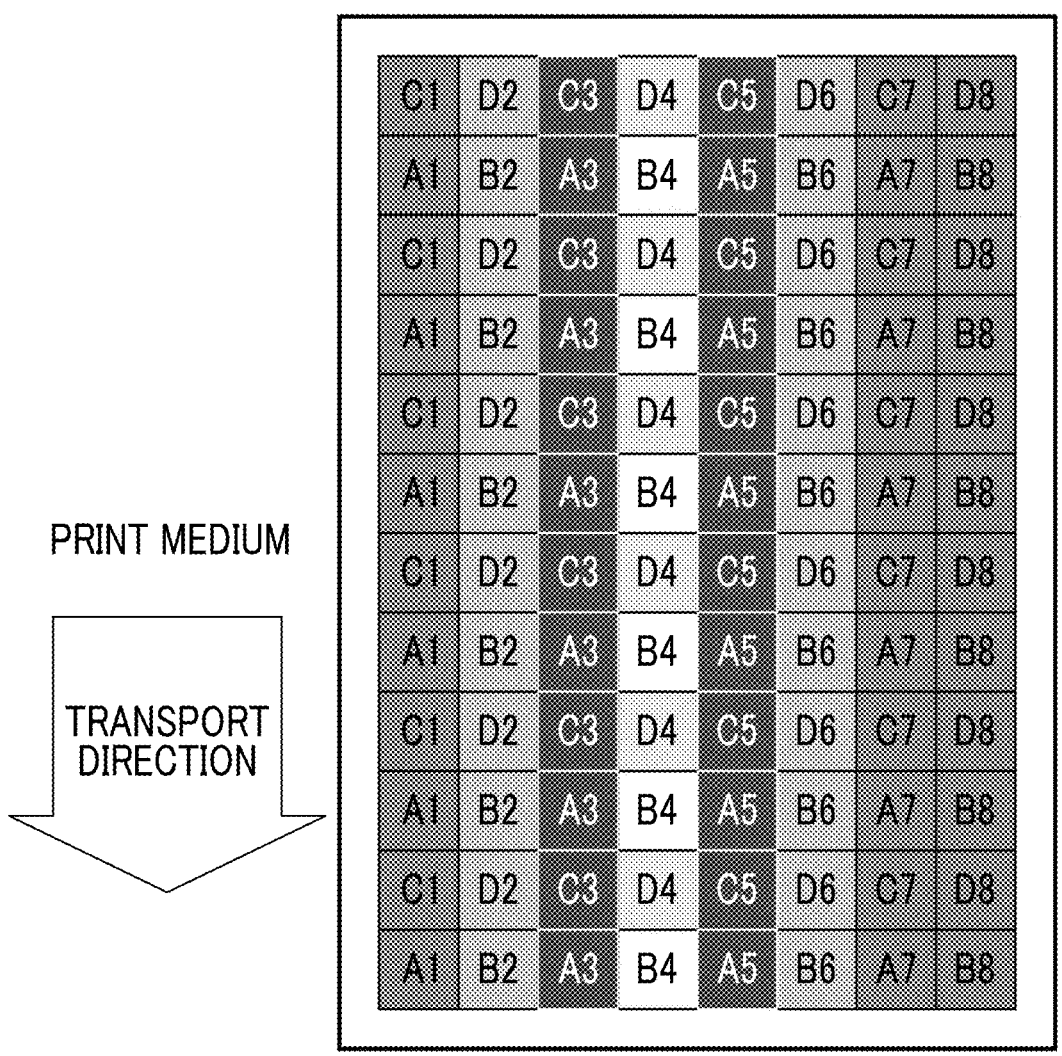

In the method (1D) illustrated in FIGS. 26A and 26B, the defective nozzle B4 is masked, and the correction nozzles A3, A5, C3, and C5 are made to have a higher density. Also, the correction nozzles B2, B6, D2, and D6 are made to have a lower density than the normal nozzles, and the correction nozzle D4 are made to have a lower density than the correction nozzles B2, B6, D2, and D6. The normal nozzles A1, A7, B8, C1, C7, and D8 are not density-modulated.

In the method (1D), the spatial frequency characteristics of a high-density correction region corresponding to the correction nozzles A3, A5, C3, and C5 made to have a higher density, a low-density correction region corresponding to the correction nozzles B2, B6, D2, and D6 made to have a lower density, and a normal-density correction region corresponding to the normal nozzles are as illustrated in FIG. 29 from FIG. 27, respectively. Additionally, the spatial frequency characteristics of the correction nozzle D4 having the lowest density are the same as those of FIG. 13.

Hence, the generation of the beats can be suppressed by performing the quantization such that the peak component of the frequency of the quantization of the pixels to be recorded by each nozzle is given to the regions A50 to A54 illustrated in FIGS. 27 to 29, and the regions A10 illustrated in FIG. 13.

[Discharge Bending Correction]

Next, cases of discharge bending correction will be described. In the following description, it is assumed that the nozzle B4 has discharge bending on the right side of the drawing (on the nozzles A5 and C5 side).

In a case where the discharge bending is corrected, a discharge bending nozzle is first detected from the image recorded on the paper by the image inspection unit 24. Then, as illustrated in FIG. 30B, the densities of pixels drawn by the nozzles A3, C3, and B4 of which landing dot positions are separated due to the discharge bending among the discharge bending nozzle D4 and nozzles adjacent to the nozzle D4 are raised. Accordingly, white streaks generated due to the discharge bending are buried. Moreover, the densities of further adjacent nozzles B2, D2, A5, and C5 of the nozzles made to have a higher density are lowered. This offsets increases in density resulting from the nozzles made to have a higher density.

In the present correction method, the frequency characteristics vary depending on the nozzle groups to be selected. Hence, it is necessary to select the quantization such that beats are not caused for each nozzle group.

Figure 30A:
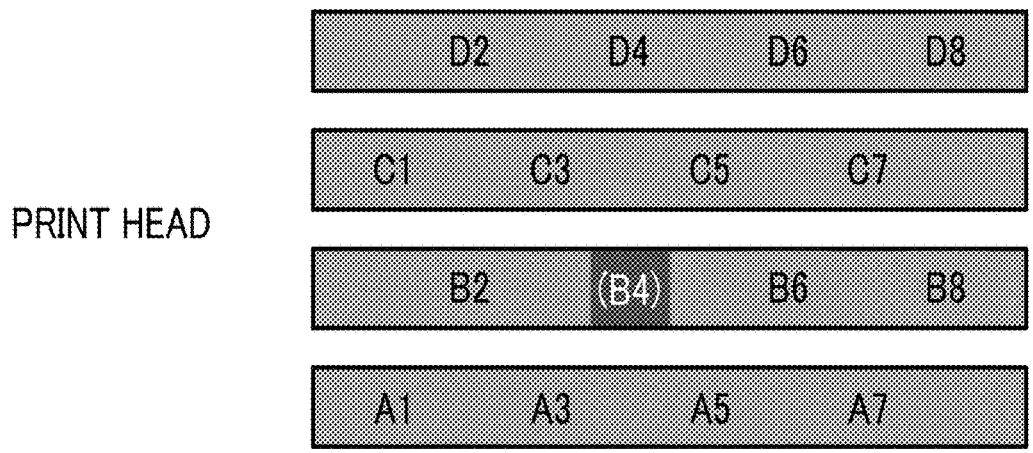
FIGS. 30A and 30B are views illustrating a positional relationship between nozzles and pixels on a print medium in a discharge bending correction method (2A).
Figure 30B:
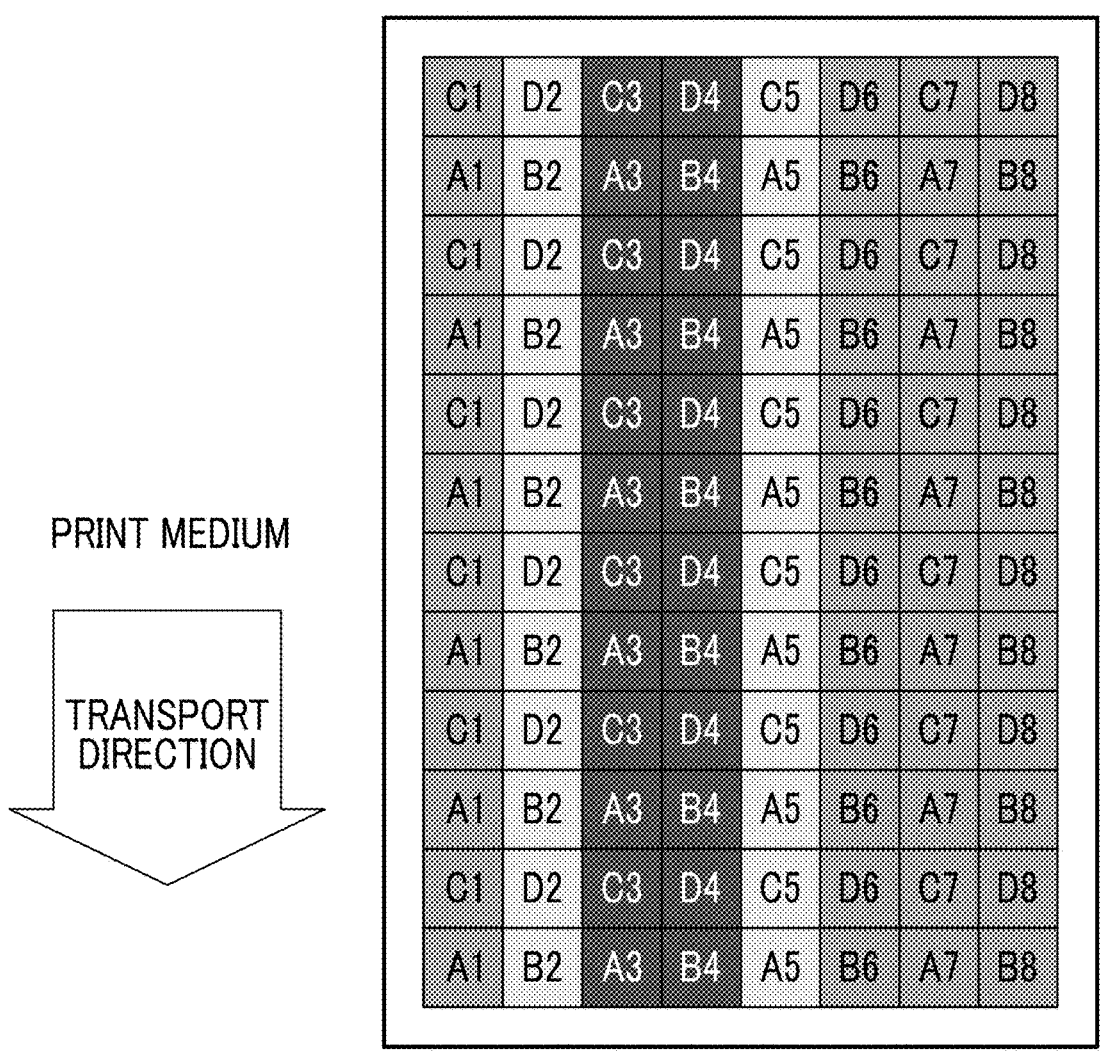
Figure 31:
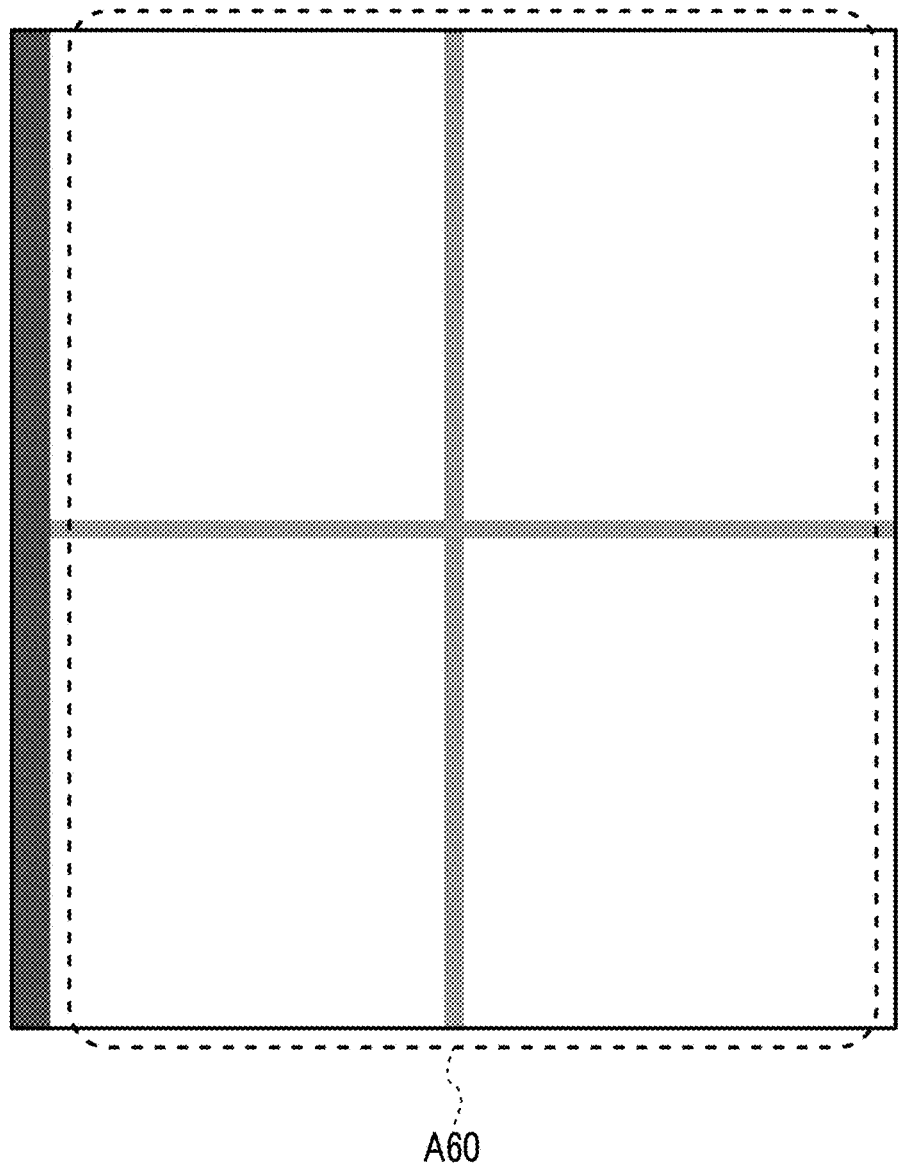
FIG. 31 is a plan view schematically illustrating frequency characteristics of the correction region in the non-discharge correction method (2A).

In the method (2A) illustrated in FIGS. 30A and 30B, the discharge bending nozzle B4 is density-modulated, and is made to have a higher density. Additionally, the correction nozzles A3, C3, and D4 adjacent to the nozzle B4 are density-modulated, and are made to have a higher density by the same parameters as B4. Also, the correction nozzles A5, B2, C5, D2 adjacent to the outsides of these correction nozzles made to have a higher density are made to have a lower density than the normal nozzles by the same parameters. The normal nozzles A1, A7, B6, B8, C1, C7, D6, and D8 are not density-modulated.

In the method (2A), since the spatial frequency characteristics are as illustrated in FIG. 3, the generation of the beats can be prevented by giving the frequency of the quantization to a region A60.

Figure 32A:
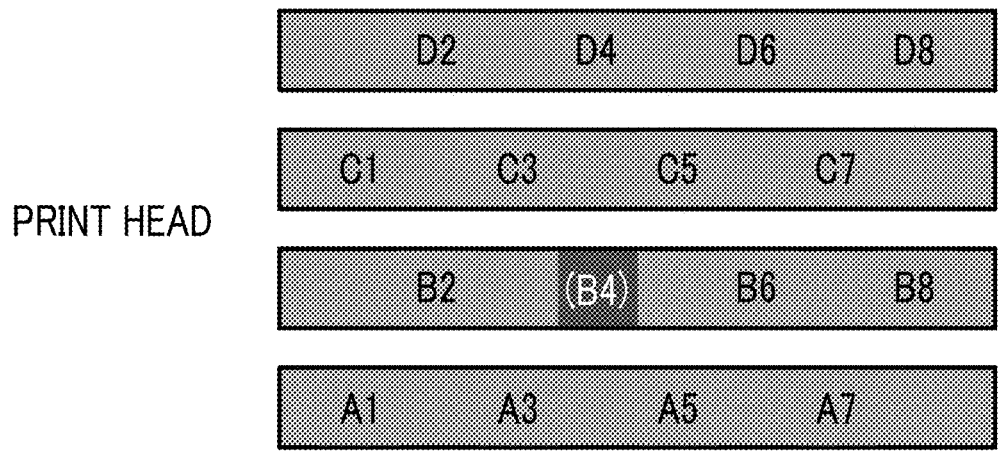
FIGS. 32A and 32B are views illustrating a positional relationship between nozzles and pixels on a print medium in a non-discharge correction method (2B).
Figure 32B:
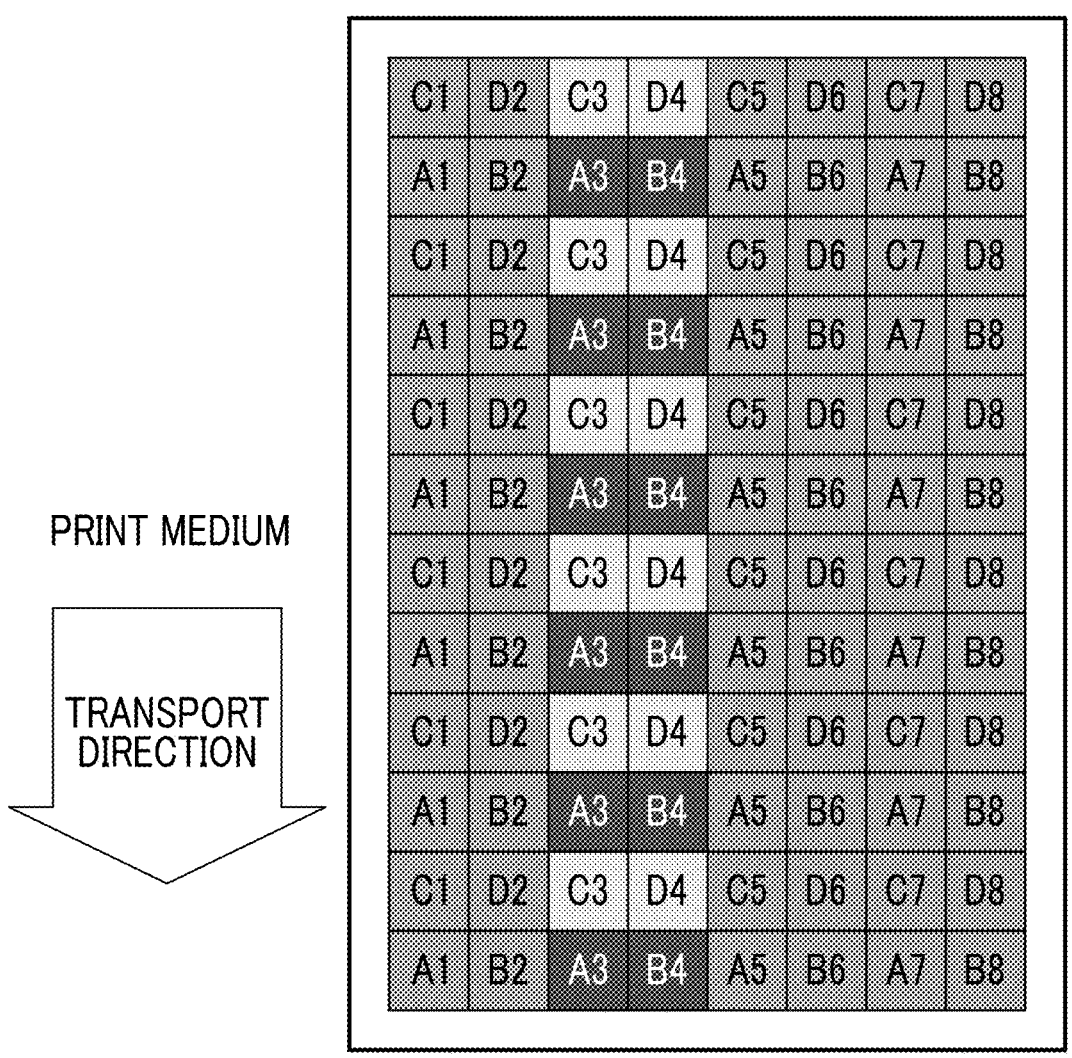

In the method (2B) illustrated in FIGS. 32A and 32B, the discharge bending nozzle B4 and the correction nozzle A3 adjacent to B4 is made to have a higher density by the same parameter. Also, the correction nozzles C3 and D4 are made to have a lower density by the same parameters. The normal nozzles A1, A5, A7, B2, B6, B8, C1, C5, C7, D2, D6, and D8 are not density-modulated.

In the method (2B), since the spatial frequency characteristics are as illustrated in FIG. 33, the generation of the beats can be prevented by giving the frequency of the quantization to a region A70.

[Selection of Quantization Method]

Regarding the density-corrected correction regions on the paper, it is appropriate to select a quantization method according to the shape of a nozzle group to be density-modulated. On the other hand, regarding the regions (normal-density correction regions onto which droplets are ejected by the normal nozzles) that are not density-modulated, it is possible to treat all the correction regions to be density-modulated as one nozzle group and choose the frequency characteristics of the quantization in which no beats are generated therefor. By doing this, it is possible to perform quantization with a higher degree of freedom regarding a non-correction unit.

[Streaky Unevenness Correction Method]

Figure 34:
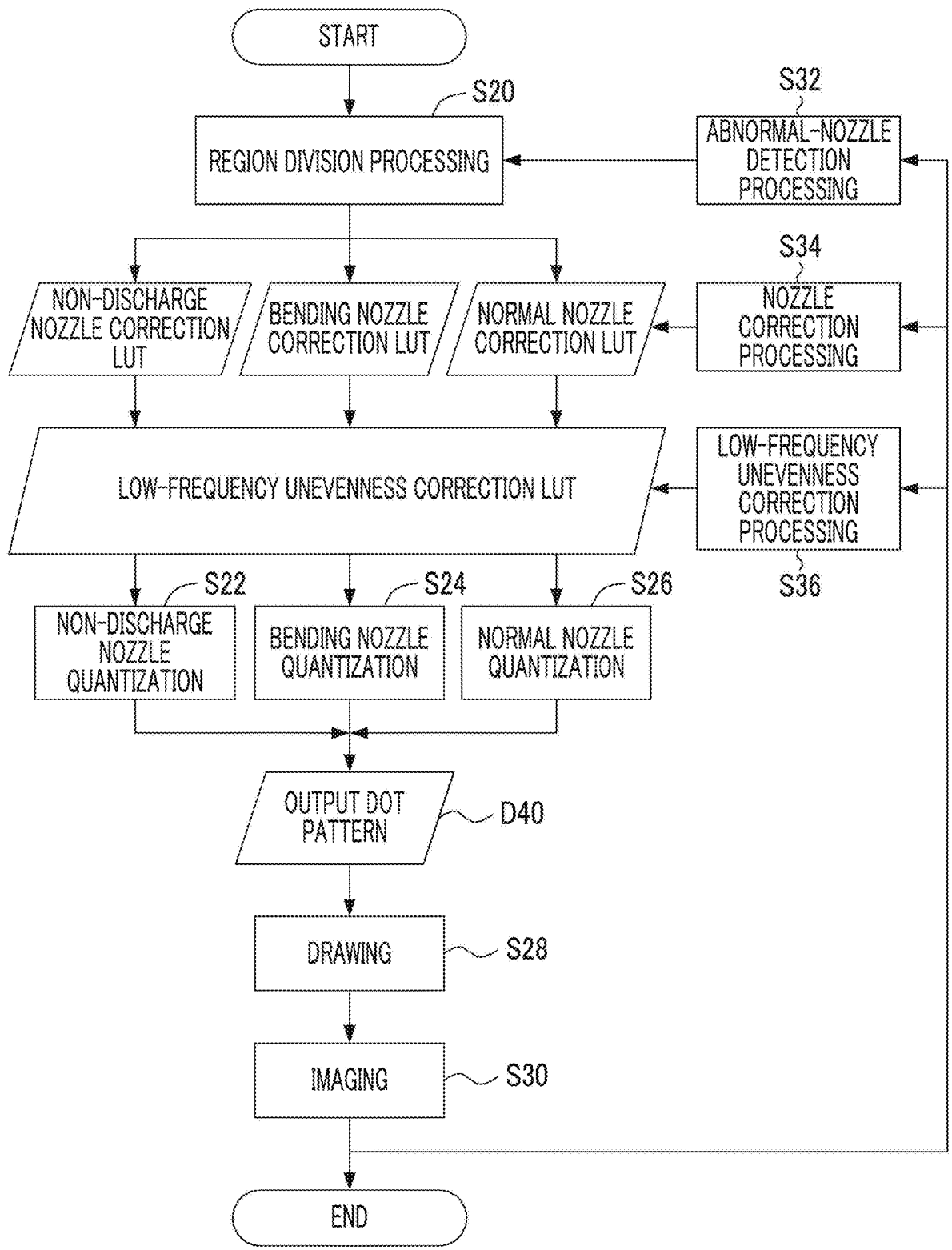
FIG. 34 is a flowchart illustrating image processing and an image recording method related to the present embodiment.

FIG. 34 is a flowchart illustrating the image processing and the image recording method related to the present embodiment. In the present embodiment, for example, a method described in Japanese Patent No. 5843400 can be used as the streaky unevenness correction method.

First, the image processing unit 18 performs the matching between the nozzles of the print head of the image recording unit 22 and the pixels recorded on the paper. Then, the image processing unit 18 divides the region of the pixels recorded on the paper, in accordance with the criteria of the following Table 1 on the basis of the abnormal nozzle information D20 (Step S20).

TABLE 1

| Evaluation value | Discharge bending amount | Discharge amount | Correction method |
| --- | --- | --- | --- |
| 1 | any | Less than certain value | Non-discharge correction |
| 1 | 8 µm or more | any | Non-discharge correction |
| 2 | 3 µm or more | any | Discharge bending correction |
| 3 | any | any | Normal discharge correction |

In Step S20, the abnormality of the nozzles are evaluated in order of conspicuous streaky unevenness and in order of the non-discharge, the discharge bending, and the normal nozzles in accordance with Table 1. Then, the image processing unit 18 sets the abnormal nozzle evaluated to be abnormal and the nozzles therearound as abnormality correction nozzles. Then, the invisibilization processing is performed for each region depending on the results of the region division of Step S20.

First, a nozzle of which the discharge amount of ink is less than a certain value is detected as the non-discharge nozzle. Additionally, a nozzle with a concern that discharge bending amount may be significantly large and the same streaky unevenness as the non-discharge nozzle may occur are also estimated as the non-discharge nozzle irrespective of the discharge amount. That is, a nozzle having a first threshold (8 µm in the example of Table 1) than a second threshold (3 µm in the example of Table 1) for detection of the discharge bending nozzle are determined to be the non-discharge nozzle. Then, a nozzle group around each non-discharge nozzle is set as the non-discharge correction nozzle group, and is divided as the non-discharge nozzle regions.

In addition, the thresholds used for the evaluation in Table 1 are merely examples, and can be changed depending on accuracy required for the paper and recording images. Additionally, "Any" of the discharge bending amount of Table 1 means not equivalent to the first threshold of 8 µm or more and the second threshold of 3 µm or more. "Any" of the discharge amount means not equivalent to less than the certain value.

Regarding the non-discharge nozzle and the nozzles set to the non-discharge correction nozzle group, the image processing unit 18 masks the non-discharge nozzle, and modulates the densities of the nozzles around the non-discharge nozzle in accordance with a non-discharge complement nozzle correction LUT. In the non-discharge nozzle correction LUT, the degree of modulation is changed depending on a distance from a pixel corresponding to the non-discharge nozzle on the paper. Particularly, the density of a pixel adjacent to a pixel corresponding to the non-discharge nozzle is modulated high, and an adjacent pixel opposite to the non-discharge nozzle that is modulated high is weakly modulated.

Next, the nozzle of which the discharge bending amount is equal to or more than the second threshold and less than the first threshold is detected as the discharge bending nozzle. Then, a nozzle group around the discharge bending nozzle is set as the discharge bending correction nozzle group, and region division as the discharge bending nozzle regions is performed.

The image processing unit 18 modulates the densities of the discharge bending nozzle and the nozzles set as the discharge bending correction nozzle group in accordance with the bending nozzle correction LUT. Particularly, in a case where a gap is generated due to the nozzle bending and become a white streak, the density of the pixels adjacent to both sides of the gap are modulated high and the densities of the pixels adjacent to the gap are modulated low.

Then, nozzles (nozzles in which the discharge bending amount is less than 3 µm and the condition of the discharge amount are equal to or more than the certain value), which do not fall within any of the non-discharge nozzle and the discharge bending nozzle, are determined to be the normal nozzles.

Moreover, the nozzles that do not fall within the above evaluation are determined to be normal nozzles, and the density modulation is not performed thereon. As the normal nozzle correction LUT, it is possible not to perform the density modulation by setting 1 as a modulation coefficient. In addition, as the normal nozzle correction LUT, one in which a linear correction may be performed with the coefficient as a certain value may be used.

In the above three nozzle correction LUTs (the non-discharge nozzle correction LUT, and the bending nozzle correction LUT, the normal nozzle correction LUT), a configuration in which an LUT is determined for each abnormal nozzle is possible by performing each nozzle correction processing. Additionally, it is also possible to set a fixed value without performing such processing for each nozzle. The nozzle correction processing can be carried out by performing the processing of determining a parameter for flattening a chart in which a partial region is set as a non-discharge correction region in a simulated manner, for example, as in Japanese Patent No. 5597680.

After the nozzle correction processing is carried out for each nozzle in this way, it is also possible to further perform a low-frequency unevenness correction. Usually, in order to carry out the density unevenness correction for each nozzle, it is necessary to analyze an output image with a scanner having a resolution level of the nozzles. However, it is possible to carry out a high-accuracy correction also with a scanner having a lower resolution by dividing the correction processing into the nozzle correction processing and a low-frequency correction processing as in the present configuration.

In addition, the region division processing determines correction methods of the respective nozzles on the basis of the abnormal nozzle information D20. As the determination methods, as examples other than the method according to Table 1, a configuration in which only a portion of Table 1 (for example, only evaluation of a non-discharge nozzle) is carried out is also considered. Additionally, in addition to Table 1, also in a case where there is a variation in the density of the ink that does not lead to non-discharge, a detection as an abnormal nozzle may be made.

In the low-frequency unevenness correction, the low-frequency unevenness correction LUT is further applied to a density corrected by the nozzle correction, and the density is modulated. The low-frequency unevenness correction LUT is separately created by low-frequency unevenness correction processing.

In the low-frequency unevenness correction processing (Step S36), an image expected to have a flat density is output in a plurality of grayscales, the output image is read, and the density thereof is measured. Accordingly, grayscale characteristics are obtained for each region, and a value for inversely transforming a grayscale such that the density for each region is uniformized is stored in the low-frequency unevenness correction LUT.

Next, the quantization unit 20 performs the quantization depending on a correction method for the non-discharge correction or the discharge bending correction on each of a non-discharge nozzle region, a discharge bending region, and a normal nozzle region (Steps S22 to S26), and outputs the output dot pattern D40. Here, the frequency characteristics of the quantization are adjusted as described in the respective methods (1A) to (1D), (2A), and (2B).

The image recording unit 22 controls the print head to record (draw) an image on paper, on the basis of this output dot pattern D40 (Step S28). The image inspection unit 24 captures the recording image D50 (Step S30).

Next, the system control unit 14 performs abnormal-nozzle detection processing on the basis of the captured recording image D50 (Step S32). Then, in a case where an abnormal nozzle is newly detected, the system control unit 14 updates the abnormal nozzle information D20.

Additionally, the system control unit 14 may store a history of the abnormality detection in the memory 16, and expect occurrence of an abnormality noting that the abnormality is likely to occur, for example, at a pixel position where the frequency of the abnormality detection is high, on the basis of this history. Accordingly, it is possible to efficiently detect the abnormality. The abnormal nozzle information D20 is acquired or updated by this abnormal-nozzle detection processing.

Additionally, on the captured recording image D50, the system control unit 14 performs the nozzle correction processing in a case where it is detected that the streaky unevenness is not sufficiently corrected as a result of the non-discharge correction or the discharge bending correction (Step S34), and the non-discharge nozzle correction LUT or the bending nozzle correction LUT is updated. In addition, in the nozzle correction processing, instead of updating the non-discharge nozzle correction LUT or the bending nozzle correction LUT, for example, correction nozzles may be changed (Step S34). In Step S34, for example, in a case where it is detected that the sufficient streaky unevenness correction could not be performed in a case where the streaky unevenness correction is performed on a non-discharge nozzle by the method (1A), another method (1B) or the like may be performed.

[Quantization Method]

Next, the quantization will be described. Regarding the quantization, a configuration in which a threshold matrix is used is suitable. As frequency characteristics of the threshold matrix, desired characteristics can be realized by giving the characteristics described in the respective methods (1A) to (1D), (2A), and (2B).

In the quantization, for example, a method described in Japanese Patent No. 5189664 can be used as a method of creating a threshold matrix for realizing a specific frequency. A general threshold matrix creation method is described after Paragraph [0062] of Japanese Patent No. 5189664. A method of controlling a frequency suitable for the present embodiment is described after Paragraph [0094] of Japanese Patent No. 5189664. Particularly, it is possible to control frequency characteristics of a pattern by folding an actual space filter as described in FIG. 13 of Japanese Patent No. 5189664 official report into a filter that emphasizes a low-frequency component, and optimizing the pattern. By changing filters, it is also possible to realize frequency characteristics other than the frequency characteristic described in FIG. 11 of Japanese Patent No. 5189664.

Figure 35:
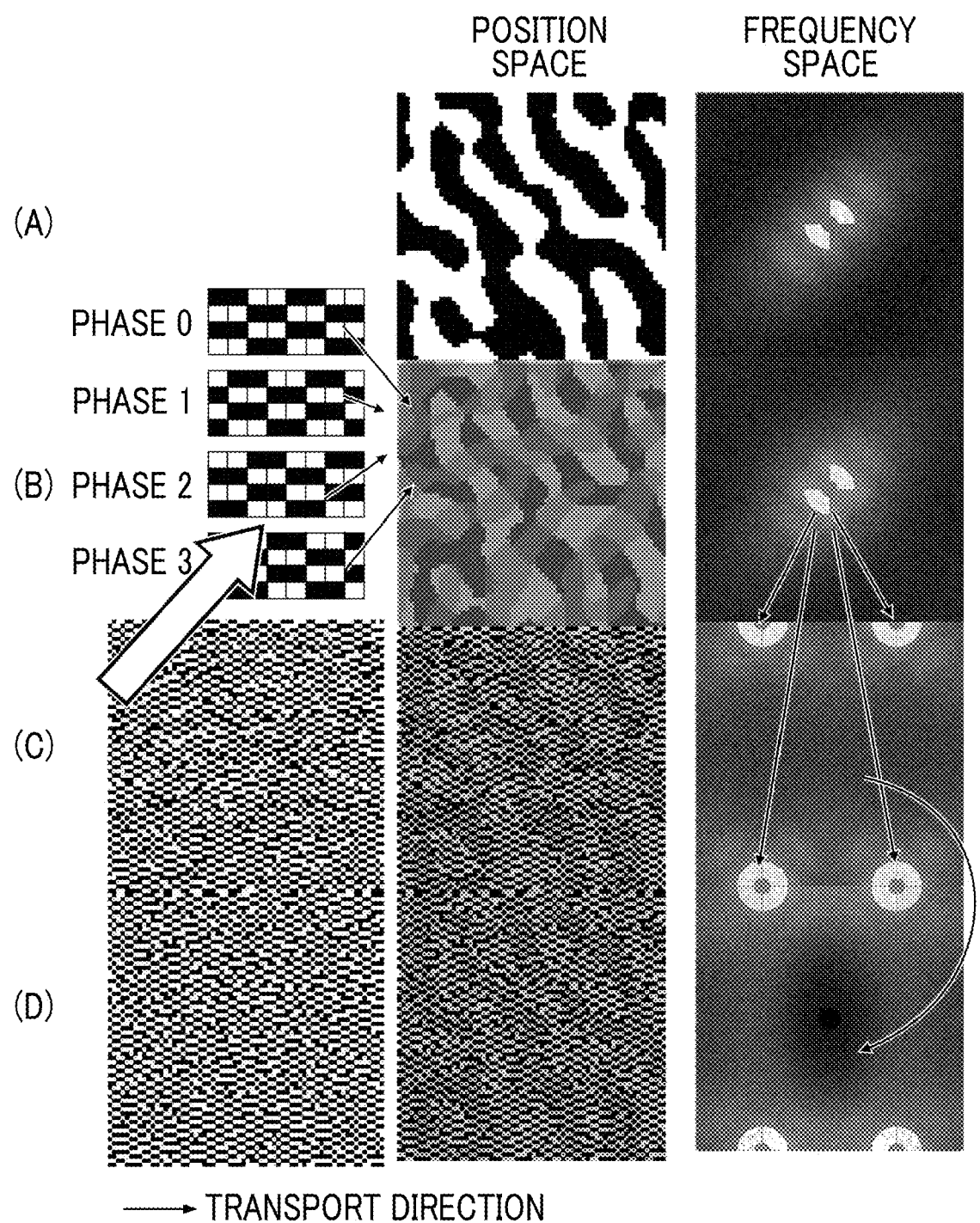
FIG. 35 is a view for illustrating the quantization related to the embodiment of the invention.

For example, a method described in Japanese Patent No. 5901584 can be used rather than the method described in Japanese Patent No. 5189664 in a case where it is desired to concentrate the peak component of the frequency of the quantization on a specific frequency band. As a "reference frequency" described in Japanese Patent No. 5901584, it is possible to perform the quantization suitable for the present embodiment by adopting a frequency sufficiently away from the peak frequency of a spatial frequency corresponding to the shape of a correction region. That is, as illustrated in (A) of FIG. 35, a green-noise-like transfer pattern is generated (binary). Then, as illustrated in (B) of FIG. 35, phase components (binary values) are combined together to form a quaternary value. A repeated pattern (a pattern described as a phase 0 and a phase 3 of (B) of FIG. 35) having a desired peak frequency component and having a different phase is folded into the green noise pattern ((C) of FIG. 35). By this folding, as indicated by arrows in frequency spaces on the right sides of (B) of FIG. 35 and (C) of FIG. 35, components move to a keying frequency part. Then, the pattern is further optimized so as to suppress the low-frequency component of the folded pattern ((D) of FIG. 35). Accordingly, the low-frequency component of a change in the density of an image is suppressed and flattened.

Figure 36:
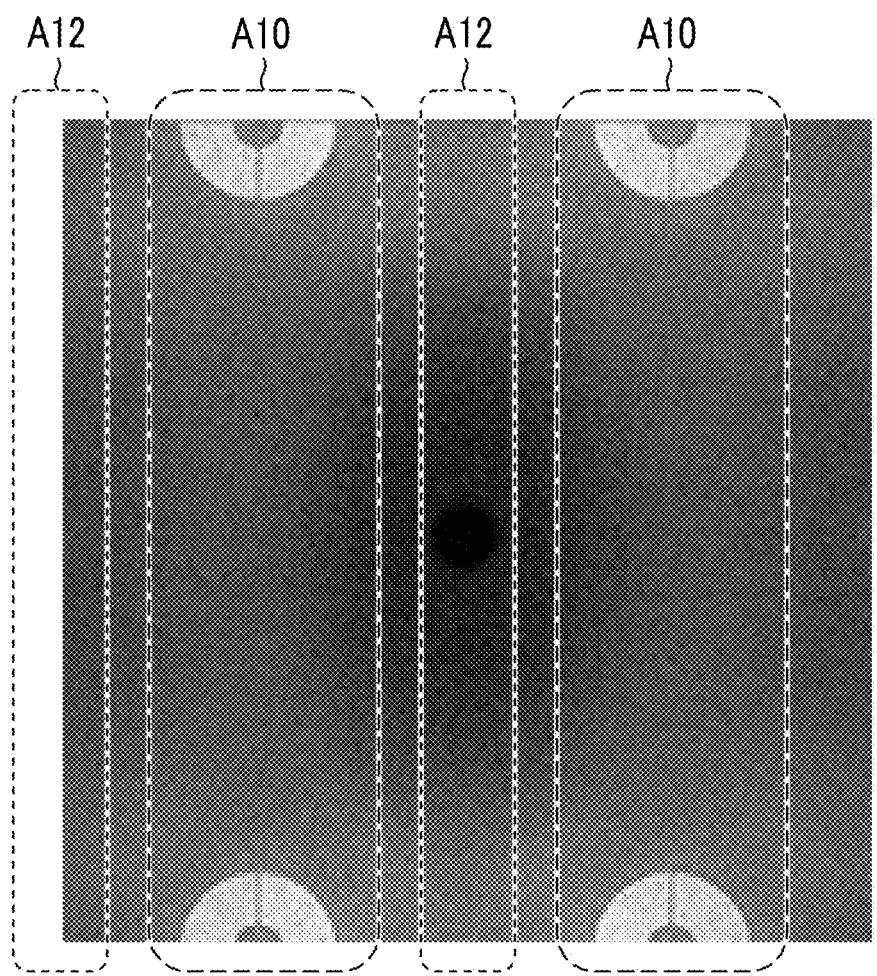
FIG. 36 is a view illustrating frequency characteristics of quantization patterns.

Frequency characteristics of quantization patterns created by the above-described method are illustrated in FIG. 36. In addition, in FIG. 36, amplitude components are as large as a band illustrated in white. That is, the band illustrated in white is the peak of the frequency of the quantization. In the correction region (nozzle mapping) illustrated by the present embodiment, the peak of the spatial frequency corresponding to the shape of the correction region is present in the region A12. However, in an example illustrated in FIG. 36, the frequency peak of the quantization is present in a region A10. By performing such quantization processing, it is possible to suppress the generation of the beats.

The quantization patterns of the present example can be generated by creating the threshold matrix using the above pattern.

In addition, in the present embodiment, configurations in which peak frequency components are changed for each type of correction, each nozzle group, and each droplet type are suitable. Next, examples of algorithm in which threshold matrices (dither) are changed for each correction region (comp) are illustrated. In this algorithm, regarding an input image (two-dimensional input image) input_image [y, x], the droplet type of the output image is changed on the basis of a relationship between data gamma [comp] [y, x] [input_image[y, x]] after the correction region comp is gamma-converted, and the threshold-matrix dither.

First, in the case of dither[comp] [large] [y, x]<gamma [comp][y, x] [input_image[y, x]], output_image[y, x]=large, that is, a large droplet" is obtained.

Next, in the case of dither[comp] [large] [y, x]≥ gamma [comp] [y, x] [input_image[y, x]] and dither[comp] [middle] [y, x]<gamma comp[y, x] [input_image[y, x]], output_image [y, x]=middle, that is, a "middle droplet" is obtained.

Next, in the case of dither[comp] [middle] [y, x]≥gamma [comp][y, x] [input_image[y, x]], and dither[comp] [small] [y, x]<gamma[comp][y, x] [input_image[y, x]], output_image[y, x]=small, that is, a "small droplet" is obtained.

Next, in the case of dither[comp][small][y, x]≥gamma [comp][y, x][input_image[y, x]], output_image[y, x]=none, that is, "no droplet" is obtained.

In this case, various threshold matrices switched depending on correction regions are threshold matrices having peaks in bands other than the frequency peak of a correction region to which correction is applied.

Additionally, since these threshold matrices are used in regions adjacent to each other, it is preferable that the threshold matrices vary mutually continuously. As one method for realizing such characteristics, a method of referring to a pattern that is common in a certain grayscale as a restriction in a case where a threshold matrix is generated in a case where a plurality of threshold matrices are generated and optimizing the pattern is considered. This enables the same effects to be obtained. As another method, a method of creating a threshold matrix corresponding to one correction method in advance and referring to a threshold matrix in a case where the threshold matrix corresponding to the other correction method is generated is considered.

For example, as described in Japanese Patent No. 4670696, it is possible to enhance continuity between correction regions by regarding a portion corresponding to a normal correction region as the "basic threshold matrix" of Japanese Patent No. 4670696, regarding a correction region close to a defect as a submatrix, and creating a submatrix that is a threshold matrix of the correction region while referring to the basic threshold matrix. By doing this, it is possible to maintain the continuity between the threshold matrices even in a wider grayscale range.

In addition, although the method of using a plurality of threshold matrices has been shown above, a method of using a threshold matrix and an error diffusion method together and changing the matching ratio of both the methods is also possible. An example of such a method is disclosed in, for example, Japanese Patent No. 5056667. As a combined-use method of the threshold matrix and the error diffusion, the quantization is performed in accordance with the following algorithm.

Figure 37:
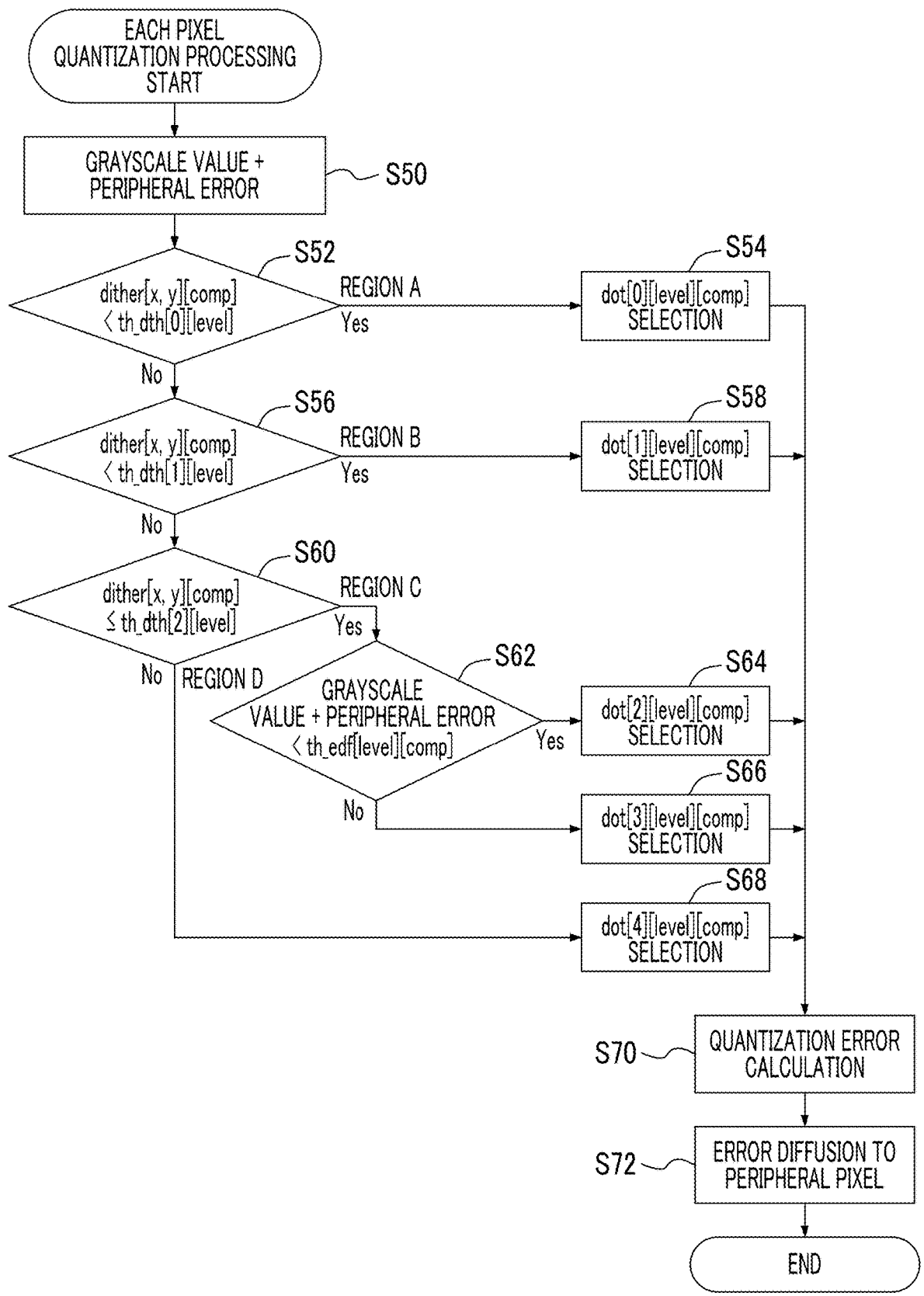
FIG. 37 is a flowchart illustrating quantization processing of respective pixels.

Next, an example of the quantization processing in which the dither matrix (synonymous with "threshold matrix") and the error diffusion method are used together will be described. FIG. 37 is a flowchart illustrating the quantization processing of the respective pixels. In FIG. 37, dither[x, y][comp] represents components of a two-dimensional dither matrix. th_dth[i] [level] indicates a threshold to be compared with the dither matrix (i=0, 1, 2). th_edf [level] indicates an error diffusion threshold. dot[j] [level] [comp] is associated with any dot size among {no droplet, a small droplet, a middle droplet, and a large droplet} for each grayscale value (level) (dot[j][level] [comp]∈{no droplet, small droplet, middle droplet, and large droplet}, j=0, 1, 2, 3, 4).

In a case where each pixel quantization processing starts, first, the quantization unit 20 calculates a grayscale value including a peripheral error by taking the sum an original grayscale of a target pixel and the value of the peripheral error diffused in the target pixel by the error diffusion (Step S50).

Next, region division of an image is performed by comparing the value (dither[x, y][comp]) of the dither matrix with the threshold th_dth[i][level]. This threshold th_dth[i] [level] is set for each grayscale value (level) of the target pixel and is stored in a predetermined memory in advance. Here, division into 4 of a region A to a region D regions is performed using a first threshold th_dth[0] [level], a second threshold th_dth[1] [level], and a third threshold th_dth[2] [level].

First, comparison between the value dither[x, y] [comp] of the dither matrix and the first threshold th_dth[0][level] is performed (Step S52). As a result of the comparison, in a case where the value of the dither matrix is smaller, a dot size specified by dot[0] [level] [comp] is selected (Step S54).

In Step S522, in a case where the value of the dither matrix is equal to or more than the first threshold, subsequently, comparison between the value of the dither matrix and the second threshold th_dth[1][level] is performed (Step S56). As a result of the comparison, in a case where the value of the dither matrix is smaller, a dot size specified by dot[1] [level] [comp] is selected (Step S58).

In Step S60, in a case where the value of the dither matrix is equal to or more than the second threshold, comparison between the value of the dither matrix and the third threshold th_dth[2] [level] is further performed (Step S60). In a case where the value of the dither matrix is equal to or more than the third threshold th_dth[2] [level], comparison between the grayscale including the peripheral error and the error diffusion threshold th_edf[level] is performed (Step S62). This error diffusion threshold th edf[level] is set for the grayscale value of the target pixel and is stored in the predetermined memory stores in advance. In a case where the grayscale value including the peripheral error is smaller than the error diffusion threshold as a result of the comparison in Step S62, a dot size specified by dot[2][level] [comp] is selected (Step S64).

On the other hand, in Step S62, in a case where the grayscale value including the peripheral error is equal to or more than the error diffusion threshold, a dot size specified by dot[3] [level] [comp] is selected (Step S66). In this way, the processing of binarization by the error diffusion method s performed in a region where the dither threshold is equal to or less than the third threshold (and equal to or more than the second threshold).

Additionally, in Step S60, in a case where the value of the dither matrix is larger than the third threshold, a dot size specified by dot[4] [level] [comp] is selected (Step S68).

In addition, the dot size of each dot[j] [level] [comp] can be appropriately determined for each grayscale value. For example, certain grayscale can be determined such that dot[0] [level] is a small droplet, dot[1][level] is a middle droplet, dot[2] [level] is no droplet, dot[3][level] is a large droplet, and dot[4] [level] is a large droplet. Basically, dot[3] [level]>dot[2][level] only needs to be satisfied, and the respective values are determined such that a large dot is jet in a case where the quantization error is large and a small dot is jet in a case where the quantization error is small.

The first threshold matrix is used in a case where the target pixel is a pixel belonging to a non-discharge neighborhood region, and the second threshold matrix is used and the quantization is performed, in a case where the first threshold matrix is a pixel belonging to a normal region. After the dot size of the target pixel is selected, the quantization error is calculated (Step S70). The quantization error is an error caused by quantizing a grayscale value including a peripheral error, and is difference between the grayscale value including peripheral pixels and a quantization threshold. The quantization threshold is a grayscale value associated with each of dot[0] [level], dot[1] [level], dot[2] [level], dot[3] [level], and dot[4] [level].

This calculated quantization error is diffused to peripheral pixels in accordance with a predetermined error diffusion matrix (Step S72). Subsequently, all the pixels are quantized by shifting the target pixel for the quantization to its adjacent pixel and performing the same processing.

According to the above quantization processing, the recording rates of dot[0][level], dot[1] [level], and dot[4] [level] of the respective regions equivalent to Steps S54, S58, and S68 are determined in accordance with the dither matrix, and the remaining regions are determined by performing the binarization by the error diffusion method (Steps S70 and S72). By performing the quantization in this way, the recording rate of a quarternary value can be uniquely determined for each grayscale.

In the present embodiment, the threshold in the original grayscale of the target pixel has been used as each threshold th_dth[i][level]. However, a threshold in the grayscale value including the peripheral error may be used.

In addition, the respective parameters can be changed by the correction regions (comp). In addition, in the present configuration, first, division into four types of regions A, B, and C, and D is made for each correction region (subscript of the above comp) by comparing the threshold th_dth to be compared with the threshold matrix. A dot is determined by the comparison with the error diffusion threshold only in the region C among these regions, and a dot is determined as it is in the other regions. That is, as the proportions of the regions A, B, and D are closer to the proportion of dots to be generated, a pattern is determined by the threshold matrix. On the contrary, as the proportions of the regions A, B, and D are farther from the proportion of dots to be generated, a pattern is determined by the error diffusion.

More specifically, in a specific correction region, in a case where the value of th_dth[1] and the value of th_dth[2] are brought close to each other, the proportion of the region C decreases. For this reason, more frequency characteristics of the threshold matrix are reflected in the correction region. On the contrary, since the proportion to be determined by a pattern is increased due to the error diffusion in a case where the value of th_dth[1] and the value of th_dth[2] are separated from each other, more characteristics of the error diffusion are reflected in the target correction region. In this way, it is possible to perform quantization processing that suited the correction region by changing the value of th_dth [1], and the value of th_dth[2] for every correction region.

For example, in a case where a mask having a frequency peak at a position shifted from the peak f the frequency characteristics of a certain correction region is selected as the threshold matrix, characteristics suitable for the present embodiment can be obtained by adopting a configuration in which contribution of the threshold matrix is increased in a corresponding correction region and increasing contribution of the error diffusion in the other region.

Particularly, in this case, by referring to a common threshold matrix in different correction regions by different methods and performing the quantization, different characteristics can be realized while giving continuity between correction regions.

Additionally, in addition to the threshold matrix, it is also possible to remove the peak component of the frequency of the quantization from the frequency peak of the correction region by the error diffusion.

As one example, it is possible to change the error diffusion matrix for each correction region. Moreover, it is also effective to increase the proportion of the quantization error to be passed to the same correction region with respect to the amount to be passed to different correction regions (Steps S70 and S72).

In addition, in the image processing method related to the present embodiment, the association between the nozzles and the pixels on the paper is performed. Therefore, the image processing method can be applied to any types of image recording apparatuses other than the ink jet head of the above zigzag arrangement. For example, the image processing method can also be applied to shuttle scanning type ink jet recording apparatuses that reciprocates an ink jet head reciprocate in a main scanning direction perpendicular to the transport direction (sub-scanning direction) of the paper and completes an image through several times of pass. For example, the present embodiment can also be applied to disposed shuttle scanning type ink jet recording apparatuses in which a plurality of nozzles of the same color are arranged in the sub-scanning direction.

In the above-described embodiment, hardware structures of processing units, which execute various kinds of processing (for example, such the invisibilization unit, the quantization unit, and the like), are various processors as illustrated below. Various processors include exclusive electric circuits, which are processors having circuit configurations exclusively designed to execute specific processing, such as a central processing unit (CPU) that is a general-purpose processor that executes software (programs) to function as various processing units, a programmable logic device (PLD) that is a processor capable of changing a circuit configuration after manufacture of a field programmable gate array (FPGA) or the like, and an application specific integrated circuit (ASIC).

One processing unit may be constituted of one of these various processors, or may be constituted of two or more same or different processors (for example, a plurality of the FPGAs or a combination of the CPU and the FPGA). Additionally, the plurality of processing units may be constituted of one processor. As an example in which the plurality of processing units are constituted of the one processor, firstly, as represented by a computer, such as a client or a server, there is a form in which one processor is constituted of a combination of one or more CPUs and software and this processor functions as a plurality of processing units. Secondly, as represented by a system-on-chip (SOC) or the like, there is a form in which a processor, which realizes functions of an overall system including the plurality of processing units with one integrated circuit (IC) chip, is used. In this way, the various processing units are configured by using one or more of the above various processors as the hardware structure(s).

Moreover, the hardware structures of these various processors are more specifically circuitries in which circuit elements, such as semiconductor elements, are combined together.

EXPLANATION OF REFERENCES

10: image recording apparatus
12: image processing unit
14: system control unit
16: memory
18: image processing unit
20: quantization unit
22: image recording unit
24: image inspection unit
D10: input image
D20: abnormal nozzle information
D30: density modulation information
D40: output dot pattern
D50: recording image
S10 to S16: respective steps of image processing method
A1 to D8: nozzle
A10 to A70: region
Q10 to Q22: examples of peak components of quantized frequencies
S20 to S36: respective steps of image processing method
S50 to S72: respective steps of respective pixel quantization processing

What is claimed is:

1. An image processing method comprising:
   detecting an abnormality for each recording element in a recording head in which a plurality of the recording elements are arranged;
   selecting a correction recording element including an abnormal recording element of which the abnormality has been detected, and modulating densities of pixels to be recorded on a recording medium by the correction recording element to invisibilize a defect of an image, in order to correct the defect of the image resulting from the abnormal recording element depending on a detection result; and
   quantizing an image to be recorded on the recording medium, and performing the quantization such that a peak frequency component of the quantization is located in a frequency band excluding a frequency band around a spatial frequency peak of a correction region that is a pixel group to be recorded on the recording medium by the correction recording element of which a density has been modulated, wherein the quantization is performed by applying a different threshold matrix for each content of the invisibilization performed on the correction recording element.

2. The image processing method according to claim 1, further comprising:
   recording the image on the recording medium by the recording head on the basis of the quantized image,
   wherein a pixel row on the recording medium is recorded by the plurality of recording elements of the recording head.

3. The image processing method according to claim 1, wherein
   the abnormal recording element of which non-discharge of ink has been detected is masked, and
   densities of pixels to be recorded by the correction recording element other than the abnormal recording element are modulated depending on relative positions from the masked abnormal recording element.

4. The image processing method according to claim 1, wherein densities of pixels to be recorded by the correction recording element are modulated depending on relative positions from the abnormal recording element of which discharge bending of ink has been detected.

5. The image processing method according to claim 1, wherein densities of pixels to be recorded by the correction recording element are modulated depending on modulation of the abnormal recording element of which modulation of a density has been detected, with respect to pixels to be recorded.

6. The image processing method according to claim 1, wherein
   the abnormal recording element of which non-discharge of ink has been detected is masked, and
   densities of pixels to be recorded by the correction recording element other than the abnormal recording element are modulated depending on relative positions from the masked abnormal recording element, and wherein different quantizations are performed between the abnormal recording element and the correction recording element other than the abnormal recording element.

7. The image processing method according to claim 1, wherein different quantizations are performed in a normal region that is pixels to be recorded on the recording medium by a normal recording element other than the correction recording element, and the correction region.

8. The image processing method according to claim 1, wherein a degree of the modulation of a density is capable of being changed for each correction recording element, and wherein a different quantization is performed for each correction region corresponding to the correction recording element with the same degree of the modulation of the density.

9. The image processing method according to claim 1, wherein quantization is performed by applying a different threshold matrix for each correction region, and wherein the threshold matrix is generated with reference to a common pattern in a case where the different threshold matrix is generated.

10. The image processing method according to claim 1, wherein a threshold matrix and error diffusion are used together, and proportions thereof vary for each correction region.

11. The image processing method according to claim 1, wherein quantization is performed by applying different threshold matrices in a normal region that is pixels to be recorded on the recording medium by a normal recording element other than the correction recording element, and the correction region, and wherein a threshold matrix to be applied to the correction region is generated by replacing a portion of a basic threshold matrix to be applied to the normal region.

12. An image processing device comprising:
a processor, configured to:
  select a correction recording element including an abnormal recording element of which an abnormality has been detected, and modulates densities of pixels to be recorded on a recording medium by the correction recording element to invisibilize a defect of an image, in order to correct the defect of the image resulting from the abnormal recording element depending on a detection result obtained by detecting the abnormality for each recording element in a recording head in which a plurality of the recording elements are arranged; and
  quantize an image to be recorded on the recording medium, and perform the quantization such that a peak frequency component of the quantization is located in a frequency band excluding a frequency band around a spatial frequency peak of a correction region that is a pixel group to be recorded on the recording medium by the correction recording element of which a density has been modulated, wherein the quantization is performed by applying a different threshold matrix for each content of the invisibilization performed on the correction recording element.

13. The image recording apparatus comprising:
a recording head for recording an image on a recording medium; and
the image processing device according to claim 12.

* * * * *